United States Patent
Nishiyama et al.

(10) Patent No.: US 6,580,674 B1
(45) Date of Patent: Jun. 17, 2003

(54) PHASE SHIFTER AND OPTICAL HEAD DEVICE MOUNTED WITH THE SAME

(75) Inventors: Takehiko Nishiyama, Fukushima (JP); Naomitsu Umemura, Tokyo (JP); Hiromasa Sato, Fukushima (JP); Masahiro Murakawa, Fukushima (JP); Yoshiharu Ooi, Fukushima (JP); Yuzuru Tanabe, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/807,961

(22) PCT Filed: Aug. 23, 2000

(86) PCT No.: PCT/JP00/05651

§ 371 (c)(1), (2), (4) Date: May 22, 2001

(87) PCT Pub. No.: WO01/16627

PCT Pub. Date: Mar. 8, 2001

(30) Foreign Application Priority Data

Aug. 26, 1999 (JP) ............................... 11-240296
Sep. 30, 1999 (JP) ............................... 11-279312
Oct. 27, 1999 (JP) ............................... 11-305616

(51) Int. Cl.[7] ............................................. G11B 7/00
(52) U.S. Cl. ............................ 369/112.01; 369/112.16
(58) Field of Search ........................ 369/112.01, 112.16, 369/112.18, 112.19, 112.22, 118, 112.03; 359/485, 494, 500

(56) References Cited

U.S. PATENT DOCUMENTS 6,072,579 A * 6/2000 Funato ................... 369/112.12
6,266,188 B1 * 7/2001 Hayashi ..................... 359/495

FOREIGN PATENT DOCUMENTS

| EP | 0 810 591 | 12/1997 |
|---|---|---|
| EP | 0 855 701 | 7/1998 |
| EP | 0 916 989 | 5/1999 |
| JP | 60-93413 | 5/1985 |
| JP | 4-324130 | 11/1992 |
| JP | 5-100114 | 4/1993 |
| JP | 05-104676 | 4/1993 |
| JP | 5-288930 | 11/1993 |
| JP | 7-20315 | 1/1995 |
| JP | 08-228053 | 9/1996 |
| JP | 9-127335 | 5/1997 |
| JP | 9-281332 | 10/1997 |
| JP | 10-68816 | 3/1998 |

(List continued on next page.)

*Primary Examiner*—Paul W. Huber
(74) *Attorney, Agent, or Firm*—Oblon, Spivak, McClelland, Maier & Neustadt, P.C.

(57) ABSTRACT

An adhesive is coated on at least one surface of a thin film of organic material having birefringent properties and a phase-difference producing function, and a fixing substrate having transmitting or reflecting properties is bonded to the thin film of organic material by the adhesive, wherein materials satisfying relations of $E_1 < E_2$ and $E_3 < E_2$ where $E_1$ is the linear expansion coefficient of the thin film of organic material, $E_2$ is the linear expansion coefficient of the adhesive and $E_3$ is the linear expansion coefficient of the fixing substrate, and the glass transition temperature of the thin film of organic material being 150° or more, are selected.

With such structure, temperature characteristics of a phase difference can be obtained so as to reduce a temperature change of an oscillated wavelength emitted from a semiconductor laser source whereby the phase difference can be kept constant even when there is a fluctuation in a wavelength of light emitted from the semiconductor laser source due to temperature.

8 Claims, 19 Drawing Sheets

FOREIGN PATENT DOCUMENTS

| | | |
|---|---|---|
| JP | 10-90521 | 4/1998 |
| JP | 10-206635 | 8/1998 |
| JP | 10-214431 | 8/1998 |
| JP | 10-268135 | 10/1998 |
| JP | 11-31332 | 2/1999 |
| JP | 11-52133 | 2/1999 |
| JP | 11-73676 | 3/1999 |
| JP | 11-120598 | 4/1999 |
| JP | 11-241178 | 9/1999 |
| JP | 11-249099 | 9/1999 |
| JP | 11-305035 | 11/1999 |
| JP | 2000-155974 | 6/2000 |
| JP | 2000-249831 | 9/2000 |
| JP | 2000-310718 | 11/2000 |

* cited by examiner

*FIG. 9A*  *FIG. 9B*
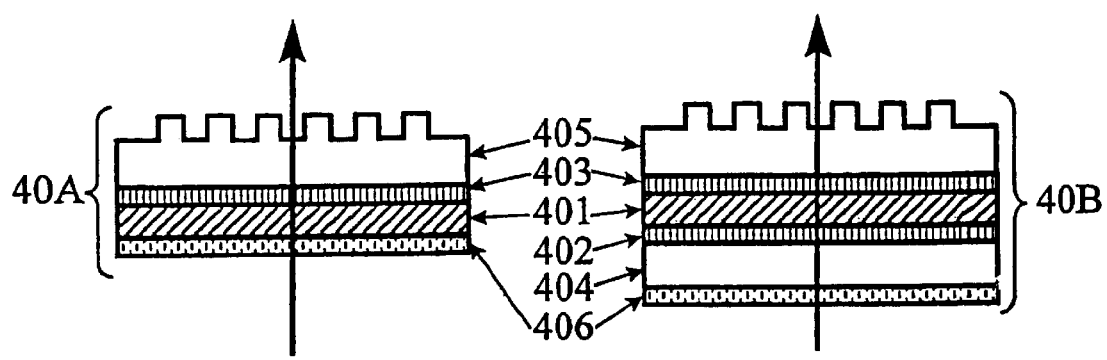
*FIG. 9C*
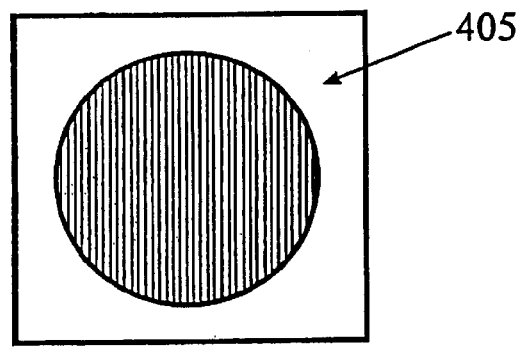

FIG. 18
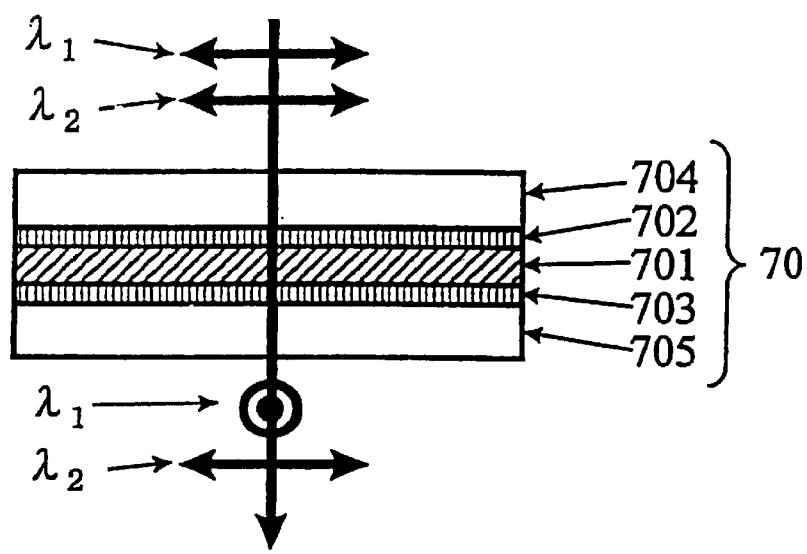
FIG. 19A  FIG. 19B
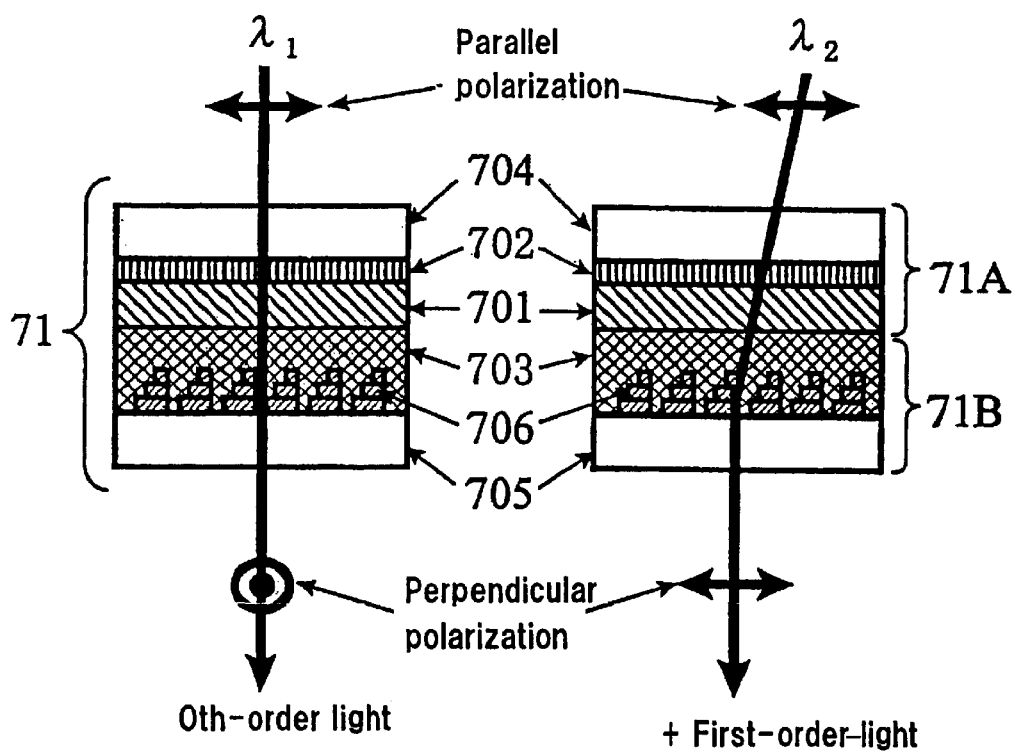

FIG. 22
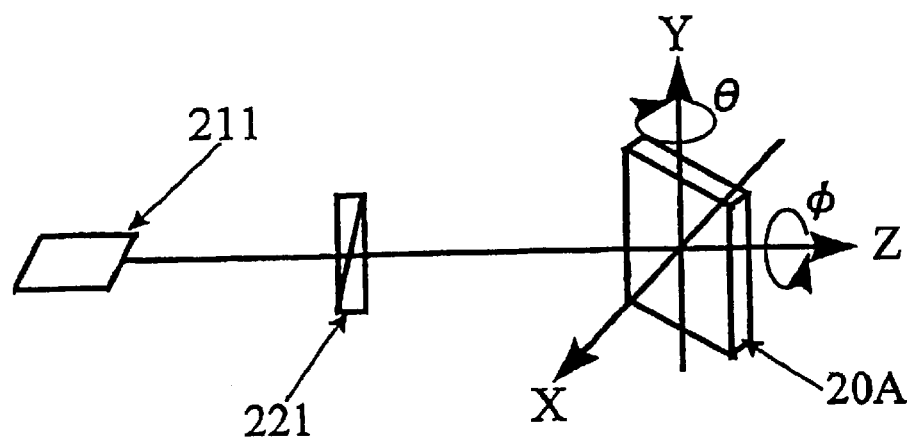
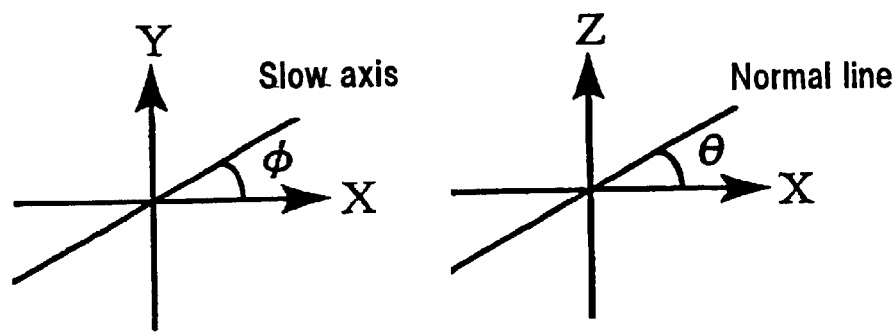

PHASE SHIFTER AND OPTICAL HEAD DEVICE MOUNTED WITH THE SAME

This application is a 371 of PCT/JP00/05651, filed Aug. 23, 2000.

TECHNICAL FIELD

The present invention relates to a retarder used for an optical head device for recording or reproducing information by irradiating light to an optical recording medium and an optical head device installing the retarder.

BACKGROUND ART

An optical head device provided with an optical element such as a retarder, a diffraction element and so on has been used in order to write (Hereinbelow, referred to as record) information in an optical recording medium such as an optical disk, e.g., CD, DVD or the like, or a magneto-optical disk (Hereinbelow, referred to as an optical disk), or read out (Hereinbelow, referred to as reproduce) information from the optical recording medium.

The optical head device is to introduce laser light emitted from a semiconductor laser light source to the optical disk by converging the laser light by means of an objective lens, and to detect information recorded in the optical disk by receiving reflected light from the optical disk by a photodetector.

In an optical path from the semiconductor laser source to the optical disk or an optical path from the optical disk to the photodetector, an optical element such as a diffraction element, a beam splitter or the like and a retarder for changing a state of polarization of laser light are properly arranged to obtain highly accurate, stable recording/reproducing. In particular, by using a combination of the optical element in which the characteristics are changed depending on a state of polarization of laser light and the retarder for changing a state of polarization, an optical system having a high utilization efficiency of light can be realized, and flexibility in designing the optical system can be improved. Accordingly, various types of optical system for optical head devices have been proposed.

For the retarder, such one prepared by polishing a single crystal of inorganic substance such as quartz has conventionally been used. However, since the single crystal of inorganic substance has large incident angle dependence on a phase difference of transmitted light, the single crystal is improper as the retarder for generating a desired phase difference. Further, in an optical element made of the single crystal of inorganic substance, the number of steps in manufacture is large. Accordingly, such one having a thin film of organic material made of, for example, uniaxially stretched polycarbonate, having birefringent properties has been proposed. In cases of using the conventional retarder formed by polishing the single crystal of inorganic substance such as quartz and the retarder comprising an organic material, there were the problems as described below, in common.

As a first problem, there is the temperature dependence of the wavefront aberration of transmitted light from the retarder. When an optical head device is operated for a long time, the temperature in the optical head device rises with a lapse of time. Further, a semiconductor laser source used for the optical head device has generally such temperature characteristics that the oscillated wavelength increases with a temperature rise. In the optical head device installing therein the retarder, an oscillated wavelength from a semiconductor laser source fluctuates due to a temperature change, a predetermined phase difference at the time when the laser light passes through the retarder can not be obtained, and an adverse influence such as a reduction of signal intensity or an increase of noises in signals may be caused in recording/reproducing an optical disk.

In the quartz or the thin film of organic material, the fluctuation of the optical characteristics due to a temperature change is generally small. Accordingly, when the oscillated wavelength from the semiconductor laser source fluctuates due to a temperature change, a fluctuation in the wavelength of the laser light could not be compensated by the retarder in which the above-mentioned material was used.

Further, since the linear expansion coefficient of a fixing substrate used in the retarder was generally different from the linear expansion coefficient of a thin film of organic material, the thin film of organic material deformed with a temperature rise, disturbances in the retardation value of the retarder and the retardation axis (fast axis) direction took place, and further, the smoothness of the thin film of organic material was reduced, whereby there was a problem of causing the disturbance of the wavefront of the laser light passing through the retarder.

As a second problem, it was difficult to minimize the size of the device because of an increased number of parts in assembling the retarder in the optical head device. In the retarder formed by polishing the single crystal of inorganic substance such as quartz, the retarder had to be located in a region of parallel light in an optical path in the optical head device because the incident angle dependence of phase difference was large, whereby there was a problem that the surface area of the retarder became large. Further, in the retarder made of an organic material, although the incident angle dependence of phase difference was small, the thickness of the retarder formed by bonding on the substrate was increased as a whole. Accordingly, it was difficult to minimize the size and the weight of the optical head device.

As a third problem, there is the wavelength dependence in a state of polarization of transmitted light in the retarder. Since the recording density can be increased by shortening the wavelength of usable laser light in an optical head device, an attempt of shortening the wavelength has been made on light sources. On the other hand, it is necessary to perform reproduction by using widespread laser light having a wavelength band of 790 nm for many compact optical disks (Hereinbelow, referred to as CD), and various optical head systems which allow the compatibility between laser light having a shorter wavelength and the ordinary laser light having a wavelength band of 790 nm have been proposed. In order to assure the compatibility with respect to the ordinary optical disks, there is a system in which the ordinary laser light source having a wavelength band of 790 nm is disposed in addition to a short wavelength laser light source having a wavelength band of 650 nm for digital versatile disks for high-density recording (Hereinbelow, referred to as DVD).

Further, as a semiconductor laser source for emitting light having two-wavelengths, a two-wavelength semiconductor laser source of monolithic structure in which a semiconductor laser source having a wavelength band of 790 nm and a semiconductor laser source having a wavelength band of 650 nm are formed in one chip, or a two-wavelength semiconductor laser source comprising a plurality of chips in which laser chips having different wavelength bands are disposed with an interval of light emitting point of about 100–300 $\mu$m, for example. With such two-wavelength semiconductor laser sources, the number of parts can be reduced to minimize the size in comparison with conventional optical head devices having two-semiconductor laser sources as separate units. Further, in the case of the two-wavelength semiconductor laser source of monolithic structure, accuracy in positioning light emitting points can be improved, and assembling and adjusting are simplified, whereby the characteristics of optical head capable of providing stable recording/reproducing information are easily obtainable.

In a case that a retarder is used for a conventional optical head device using only a single wavelength, it is easy to prepare a quarter-wave plate providing a phase difference of $\pi/2$ or a half-wave plate for providing a phase difference of $\pi$ with respect to linearly polarized incident light. However, when a retarder is used for an optical head device using two-wavelengths, it was difficult for the conventional retarder to provide optical characteristics of such technical level that the quarter-wave plate was usable for a wavelength band of 650 nm and a wavelength band of 790 nm, or the half-wave plate was usable for a wavelength band of 650 nm and a wavelength band of 790 nm.

Accordingly, for an optical head device in which laser light of different wavelengths are used for DVD and CD, it was necessary to use different retarders for different wavelengths separately whereby the size of the device was increased. Further, in a case of using the two-wavelength semiconductor laser source, it was necessary to produce a desired phase difference with respect to two different kinds of wavelength by a single retarder, and therefore, a retarder capable of producing a desired phase difference depending on different wavelengths was expected.

It is an object of the present invention to provide a retarder capable of compensating a fluctuation of wavelength caused by a temperature change of light emitted from a semiconductor laser source, in particular, capable of producing stably a predetermined phase difference even in a high temperature region, and an optical element provided with such retarder.

Further, it is another object of the present invention to provide an optical element wherein a retarder to be installed in an optical head device has a plurality of functions, whereby the optical head device can be miniaturized.

Further, it is another object of the present invention to provide a retarder for producing a desired phase difference depending on different wavelengths and an optical element provided with such retarder in an optical head device wherein laser light having two or more different wavelengths are used as light sources.

DISCLOSURE OF THE INVENTION

In accordance with the present invention, there is provided a retarder comprising a thin film of organic material having birefringent properties, an adhesive coated on at least one surface of the thin film of organic material, and a fixing substrate having transmitting or reflecting properties, bonded to the thin film of organic material by the adhesive, wherein among the linear expansion coefficient $E_1$ of the thin film of organic material, the linear expansion coefficient $E_2$ of the adhesive and the linear expansion coefficient $E_3$ of the fixing substrate, relations of $E_1<E_2$ and $E_3<E2$ are satisfied.

Further, the present invention is to provide the above-mentioned retarder, wherein the thin film of organic material includes at least one selected from the group consisting of polycarbonate, polyimide, polyallylate, polyethersulfone, (alicyclic) polyolefin, poly(meth)acrylate, polyetherimide and polymerized liquid crystal.

Further, the present invention is to provide the above-mentioned retarder, wherein the adhesive includes at least one selected from the group consisting of acryl type, epoxy type, urethane type and polyester type.

Further, there is provided an optical head device comprising a semiconductor laser light source, an objective lens for converging laser light emitted from the semiconductor laser light source, an optical recording medium to which the laser light is converged and introduced, a photodetector for receiving reflected light from the optical recording medium and, an optical element fabricated by combining the above-mentioned retarder with a polarizing diffraction element having different diffraction efficiencies depending on a state of polarization of incident light wherein the optical element is located in an optical path from the laser light source to the optical recording medium, or an optical path from the recording medium to the photodetector.

Further, there is provided an optical element wherein a structure having at least one element among the following three elements is formed on a fixing substrate on which the above-mentioned retarder is formed:

(1) an aperture controlling element provided with a first region in a central portion, which transmits light having two or more kinds of wavelength and a second region surrounding the first region, which reflects or diffracts light having one or more kinds of wavelength, (2) a retarder having a ringed belt-like groove for correcting the wavefront of transmitted light in a central portion, which transmits light having two or more kinds of wavelength, and (3) a diffraction element having a periodic concave and convex portion in cross-sectional view, which diffracts incident light.

Further, the present invention is to provide an optical head device wherein laser light emitted from a semiconductor laser source is converged by an objective lens to be introduced into an optical recording medium, and reflected light from the optical recording medium is received by a photodetector, the optical head device being characterized in that the above-mentioned optical element is located in an optical path from the laser light source to the optical recording medium, or a light path from the optical recording medium to the photodetector.

Further, the present invention is to provide an optical head device comprising a semiconductor laser light source for emitting laser light having two or more different wavelengths, an objective lens for converging the laser light emitted from the semiconductor laser light source, an optical recording medium to which the laser light is converged and introduced, a photodetector for receiving reflected light from the optical recording medium, and a broadband retarder located in an optical path from the laser light source to the optical recording medium, or an optical path from the optical recording medium to the photodetector to control a state of phase of the laser light, the broadband retarder having such structure that a phase plate A to which either one laser light is first incident and a phase plate B to which said laser light is secondly incident are piled up so that the respective optical axes are crossed wherein the ratio of the retardation value of the phase plate A to the retardation value of the phase plate B is 1.8–2.2.

Further, the present invention is to provide the optical head device described just above, wherein the laser light is two kinds of laser light having different wavelengths, the ratio of the retardation values is 2, and the degrees of elliptical polarization when the two kinds of laser light are transmitted through the broadband retarder are substantially equal.

Further, the present invention is to provide an optical head device comprising a semiconductor laser light source for emitting linearly polarized light having wavelengths of $\lambda_1$ and $\lambda_2$ ($\lambda_1<\lambda_2$), an objective lens for converging the laser light emitted from the semiconductor laser source, an optical recording medium to which the laser light is converged and introduced, a photodetector for receiving reflected light from the optical recording medium, and the above-mentioned retarder located in an optical path from the laser light source to the optical recording medium wherein the linearly polarized light having wavelengths of $\lambda_1$ and $\lambda_2$ are incident to the retarder, two thin films of organic material having birefringent properties each having a retardation value of $\lambda/2$ with respect to linearly polarized light having a wavelength of $\lambda$ in a relation of $\lambda_1 \leq \lambda \leq \lambda_2$ are piled up so that the respective optical axes are crossed, and when the linearly polarized light having wavelengths of $\lambda_1$ and $\lambda_2$ are transmitted through the thin films of organic material, the planes of polarized light provided by the linearly polarized light are rotated by the same angle.

Further, the present invention is to provide an optical head device comprising a semiconductor laser light source for emitting two kinds of linearly polarized light having different wavelengths and the planes of polarized light in parallel to each other, an objective lens for converging the laser light emitted from the semiconductor laser source, an optical recording medium to which the laser light is converged and introduced, a photodetector for receiving reflected light from the optical recording medium, and the above-mentioned retarder located in an optical path from the laser light source to the optical recording medium, or an optical path from the optical recording medium to the photodetector, wherein the retarder comprises a thin film of organic material to produce a phase difference of $2\pi(m_1-\frac{1}{2})$ ($m_1$ is a natural number) with respect to a kind of linearly polarized light and a phase difference of $2\pi m_2$ ($m_2$ is a natural number) with respect to the other kind of linearly polarized light when the two kinds of linearly polarized light having different wavelengths are transmitted therethrough with an inclination of 45° in a polarization direction in its fast axis direction, whereby the planes of polarized light provided by the linearly polarized light of two kinds of wavelengths cross perpendicularly.

BRIEF DESCRIPTION OF THE DRAWINGS

FIGS. 9(a) thruogh 9(c) are diagrams showing the structure of the optical element according to a sixth embodiment of the present invention wherein (a) is a cross-sectional view showing an example of the structure of the optical element, (b) is a cross-sectional view showing another example of the structure of the optical element, and (c) is a plan view of the optical element of (a) and (b) observed from an upper side of the drawing.

FIG. 18 is a cross-sectional view showing the structure of the retarder according to a ninth embodiment of the present invention.

FIGS. 19(a) and 19(b) illustrate cross-sectional views showing the structure of the retarder according to a tenth embodiment of the present invention wherein (a) is a cross-sectional view showing a state that linearly polarized light having a wavelength is incident to the transparent substrate with its optical axis perpendicular to the substrate and (b) is a cross-sectional view showing a state that linearly polarized light having another wavelength is incident to the transparent substrate with its optical axis oblique to the substrate.

FIG. 22 is a diagram showing a measuring optical system and a coordinate system of the reflection type retarder of the present invention.

BEST MODE FOR CARRYING OUT THE INVENTION

Embodiment 1

In the retarder of the present invention, an adhesive is coated on at lease one surface of a thin film of organic material having birefringent properties and the thin film of organic material is bonded by the adhesive to a fixing substrate having transmitting or reflecting properties.

Figure 1:
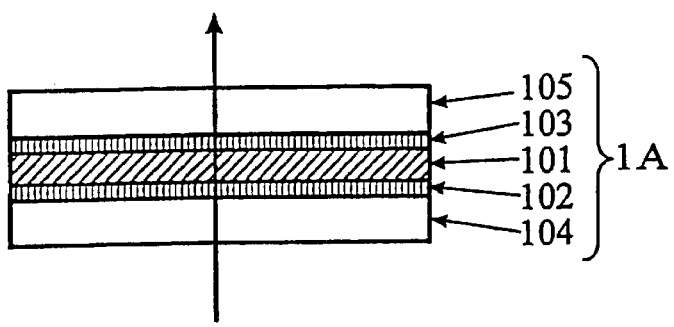
FIG. 1 is a cross-sectional view showing the structure of the retarder according to a first embodiment of the present invention.

FIG. 1 is a cross-sectional view showing the structure of a retarder 1A according to a first embodiment. In the first embodiment, a thin film having birefringent properties, i.e., a phase-difference producing function is fixed between two opposed fixing substrates by an adhesive. As the thin film of organic material used for the retarder, a thin film of organic material formed by uniaxially stretching a thin film of polymer such as polycarbonate, polyimide, polyallylate, polyethersulfone, (alicyclic) polyolefin, poly(meth)acrylate or the like to provide birefringent properties, hence, a phase-difference producing function, may be used.

Although resins other than these resins may also be used as such a thin film having a phase-difference producing function, it is preferred, in a view of heat resistance, to use (modified) polycarbonate, polyimide, polyallylate, polyethersulfone, (alicyclic) polyolefin, poly(meth)acrylate or polyetherimide. For industrial use as mass production product, polycarbonate is more preferable as the stability is good. A thin film of polymerized liquid crystal obtained by coating a monomer of polymerized liquid crystal onto a fixing substrate, the liquid crystal being subjected to a conventional aligning treatment, followed by curing can be used as a thin film of organic material. The above-mentioned polymerized liquid crystal may be either of a side chain type or a main chain type. When the glass transition temperature of a thin film of organic material is 150° C. or more, deterioration in the birefringent properties, i.e., the phase-difference producing properties of the thin film of organic material, due to a temperature rise can preferably be prevented.

As material for the adhesive, acryl type, epoxy type, urethane type, polyester type, polyimide type, urea type, melamine type, furan resin type, isocyanate type, silicone type, cellulose type, vinyl acetate type, vinyl chloride type, rubber type or a mixture thereof may be used. An adhesive of a UV curing type or a thermosettable type is preferable because workability is good. However, the adhesive is not limited to the above. Further, the adhesive should be coated smoothly as thin as possible with a constant thickness in order to minimize the wavefront aberration. For example, it is preferable to finish smoothly so that the transmission wavefront aberration of the retarder is 0.02 $\lambda_{rms}$ or less ($\lambda$ is a wavelength and rms is a root-mean-square value). As a method of coating, a method for spin coating or roller coating is preferable because workability is good and control to the thickness is easy.

As the fixing substrate having a transmitting function, a smooth optical glass is preferred. Further, as the fixing substrate having a reflecting function, it is possible to use an optical glass on which a reflecting surface is formed by using a thin film of aluminum or another metal on its surface. Further, in order to reduce a difference between the refractive index of the adhesive and the refractive index of the thin film of organic material having a phase-difference producing function; a disturbance of the wavefront of transmitted light generated depending on irregularity of the surface of the thin film of organic material, and a loss of reflection at the interface between the adhesive and the thin film of organic material, it is preferable to use an adhesive having a refractive index which is substantially equal to the refractive index of the thin film of organic material.

As shown in FIG. 1, surfaces of a thin film of organic material 101 of, e.g., uniaxially stretched polycarbonate are fixed to fixing substrates 104, 105 such as glass having smoothened surfaces and having a transmitting function, by adhesive layers 102, 103 of, e.g., an acrylic type. In the structure of FIG. 1, both surfaces of the thin film of organic material 101 are sandwiched and fixed by the two fixing substrates. The thin film of organic material 101 is so formed as to provide retardation values, e.g., $\lambda/4$, $5\lambda/4$, $\lambda/2$ and so on with respect to transmitted laser light having a wavelength of $\lambda$ emitted from a semiconductor laser light source.

In the thin film of organic material such as polycarbonate, the polymer chain is oriented by being stretched uniaxially so that there is a difference between the refractive index in a stretched direction and the refractive index in a direction perpendicular to the stretched direction, whereby the thin film of organic material having a phase-difference producing function given by birefringent properties is provided. It has been said that the thermal expansion coefficient of the thin film of polycarbonate is generally isotropic in the film plane, and the temperature characteristic of the retardation values (a fluctuation quantity in the retardation values relying on temperature) is small. In the experiments conducted by the applicant, it has been found that the temperature characteristic of the retardation values can be improved by bonding and fixing the thin film of polycarbonate on a transparent substrate such as glass.

Figure 2:
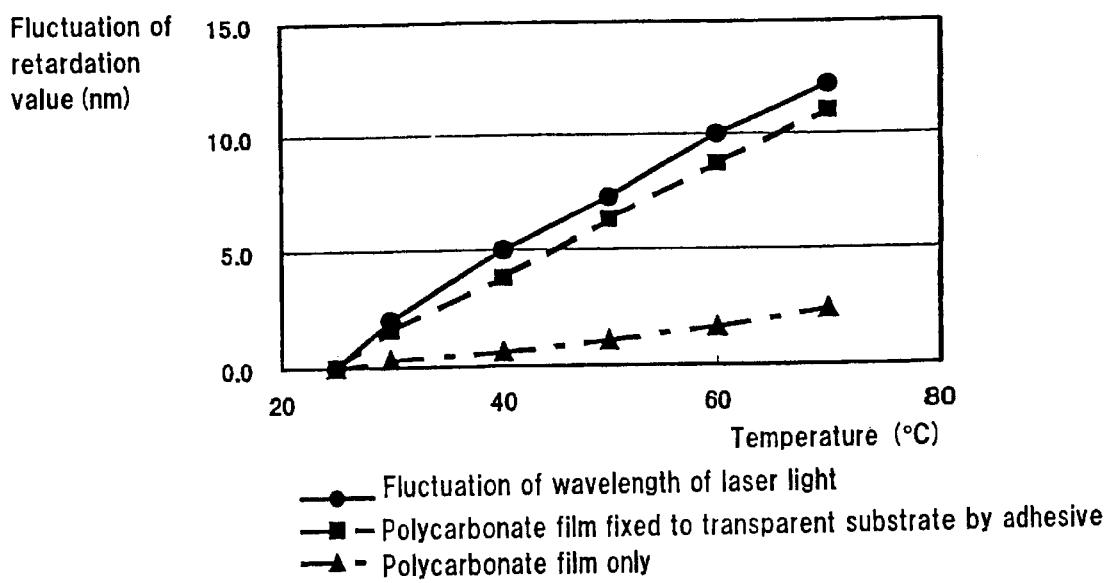
FIG. 2 is a graph showing the fluctuation of retardation value corresponding to the fluctuation of the wavelength of oscillated light from a semiconductor laser source and the fluctuation of retardation values in the retarder vs. temperature change.

As shown is FIG. 2, in the retarder of the present invention in which the retarder is fixed to transparent substrates by an adhesive (■ in FIG. 2), the wavelength functioning as a retarder becomes large with a temperature rise because the retardation value increases with a temperature rise, in comparison with a case of the thin film of polycarbonate used solely (▲ in FIG. 2). Since the wavelength of light oscillated from a semiconductor laser source generally increases with a temperature rise, it is preferable that the retardation value increases with a temperature rise (● in FIG. 2) in order to make the phase difference ($2\pi\times$ retardation value/wavelength) constant to a fluctuation of the wavelength of laser light.

In the retarder of the present invention, the temperature characteristic of retardation values is resulted in the same direction as a fluctuation of a wavelength oscillated from a semiconductor laser source, and fluctuation quantities of a wavelength of oscillated laser light and a fluctuation of retardation values of the retarder well correspond to the temperature characteristic. Therefore, a change of phase difference due to a fluctuation of the wavelength of laser light can be suppressed by a fluctuation of temperature of retardation values of the retarder. Accordingly, with use of the retarder of the present invention, it is possible to compensate the fluctuation of a phase difference caused by the fluctuation of a wavelength due to the temperature of light emitted from the semiconductor laser source. Namely, the above-mentioned problem that a predetermined phase difference can not be obtained because of the temperature characteristic of the semiconductor laser source, can be solved.

In further study by the applicant, it has been found that expansions of the thin film of organic material and the fixing substrate with a temperature rise can be absorbed by the adhesive, and the deformation of the thin film of organic material can be prevented when the linear expansion coefficient $E_1$ (/° C.) of the thin film of organic material, the linear expansion coefficient $E_2$ (/° C.) of the adhesive, and the linear expansion coefficient $E_3$ (/° C.) of the fixing substrate as the characteristics of thermal expansion coefficient of each material which constitutes the retarder satisfy the relation of Formula (1).

$$E_1 < E_2 \text{ and } E_3 < E_2 \tag{1}$$

As a result, the retarder in which there is little possibility of causing a disturbance of the wavefront of laser light passing through the retarder due to a change of the retardation value, a change of the retardation axis direction and a deformation of the thin film of organic material, can be provided, In this embodiment, polycarbonate (linear expansion coefficient $E_1=6.2\times10^{-6}$/° C.) was used as the thin film of organic material, a polyester type adhesive (linear expansion coefficient $E_2=1.2\times10^{-4}$/° C.) was used as the adhesive and a glass substrate (linear expansion coefficient $E_3=95\times10^{-7}$/° C.) was used as the fixing substrate. Since the retarder having such structure satisfies the relation of the above-mentioned Formula (1), and can absorb expansions of the thin film of organic material and the fixing substrate by the adhesive in response to a temperature change, the expansions of the thin film of organic material and the fixing substrate caused by a temperature rise, in particular, even in a high temperature region, can be absorbed by the adhesive, and stable, excellent phase-difference properties can be exhibited without causing a disturbance of the wavefront of laser light passing through the thin film of organic material and the fixing substrate which is caused by a change of the phase difference, a change of the retardation axis direction and a deformation of the thin film of organic material, or without causing an irreversible change such as peeling.

In several embodiments described below, explanation will be made as to various retarders of the present invention having structural elements for the retarders, and optical head devices using these retarders.

Embodiment 2

Figure 3:
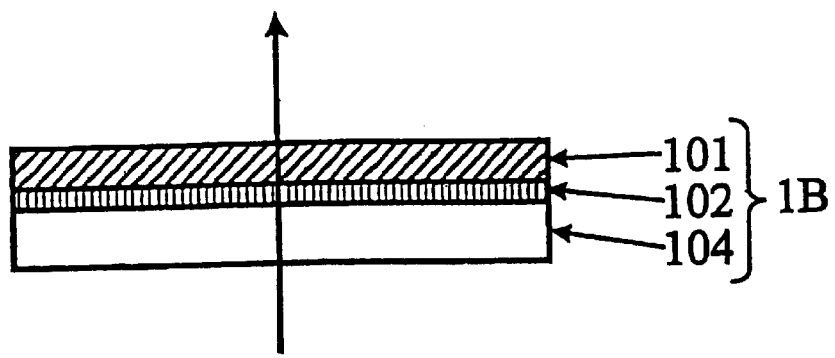
FIG. 3 is a cross-sectional view showing the structure of the retarder according to a second embodiment of the present invention.

FIG. 3 is a cross-sectional view showing the structure of a retarder 1B according to a second embodiment. In the second embodiment, A thin film of organic material 101 having birefringent properties such as a thin film of polycarbonate, having one surface on which an adhesive 102 of, e.g., a polyester type is coated, is fixed to a fixing substrate 104 made of glass having a smooth surface. Even though the retarder is of such structure that one surface of the thin film of organic material 101 is fixed to the single fixing substrate 104 by the adhesive 102, there is obtainable such effect of compensating a fluctuation of phase difference of the retarder caused by a fluctuation of temperature of an oscillated wavelength from a semiconductor laser element in the same manner as in the first embodiment. However, the first embodiment having the structure that both surfaces of the retarder are fixed can provide more remarkable effect.

Further, in a case that the retarder of the present invention is used as an optical element for, e.g., an optical head device, it is preferable to unify by piling the retarder on a polarizing diffraction element showing different diffraction efficiencies depending on polarization directions of incident light. With this, the optical element functioning as a polarizing diffraction element and a retarder is provided, and a space to be occupied in the optical head device can be reduced to thereby allow miniaturization.

Embodiment 3

Figure 4:
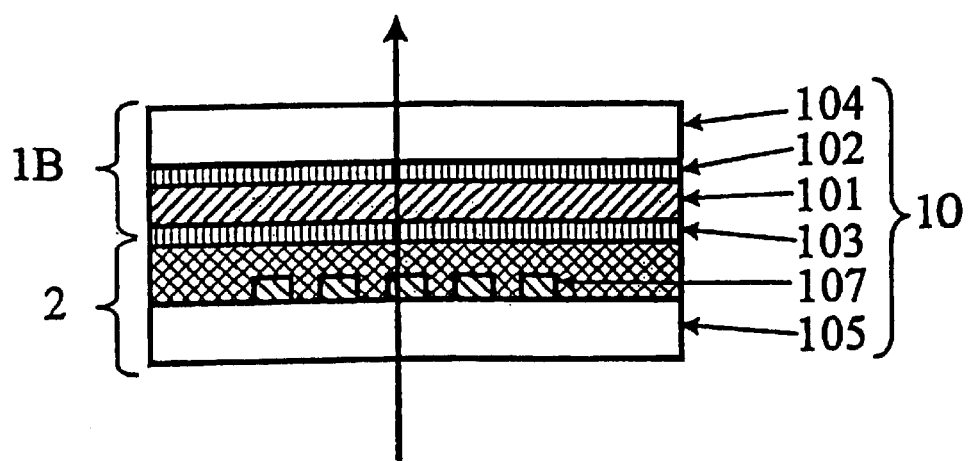
FIG. 4 is a cross-sectional view showing the structure of the polarizing diffraction type retarder according to a third embodiment wherein the retarder of the present invention and a polarizing diffraction element are unified.

FIG. 4 is a cross-sectional view showing the structure of a polarizing diffraction type retarder according to a third embodiment wherein the retarder 1B of the present invention and a polarizing diffraction element 2 are unified. In the third embodiment, on the polarizing diffraction element 2 comprising a polarizing diffraction grating 107 formed on a fixing substrate 105 having transmitting properties, one surface of a thin film of organic material 101 having birefringent properties is fixed by an adhesive 103. A fixing substrate 104 having transmitting properties is fixed on the other surface of the thin film of organic material 101 by an adhesive 102. Thus, the polarizing diffraction element 2 and the retarder 1B including the thin film of organic material 101 are unified by the adhesive 103. As the polarizing diffraction element used here, there are a diffraction element using an organic material having birefringent properties such as liquid crystal, a polymerized liquid crystal or the like, or a diffraction element using a single crystal of inorganic material having birefringent properties such as $LiNbO_3$ or the like.

When the polarizing diffraction type retarder shown in FIG. 4 is used for an optical head device for recording or reproducing information on an optical disk such as CD or DVD, it is located in an optical path between the optical disk and a photodetector for detecting reproducing signals so that the retarder 1B is at a side of the optical disk. In this case, the retardation value of the thin film of organic material 101 is determined to be λ/4 or 5λ/4 with respect to, for example, a wavelength band λ of 650 nm from a semiconductor laser light source. With this, linearly polarized laser light emitted from the semiconductor laser source rotates 90° in polarization direction in going and returning paths while the laser light goes and returns through the thin film of organic material.

In this case, the polarizing diffraction element used is such one having a high transmittance with respect to light having a polarization direction in a going path and having a high diffraction efficiency with respect to light having a polarization direction in a returning path, whereby an optical head device having a high utilization efficiency of light in going and returning the paths between the semiconductor laser source and the photodetector, can be constituted.

Embodiment 4

Figure 5:
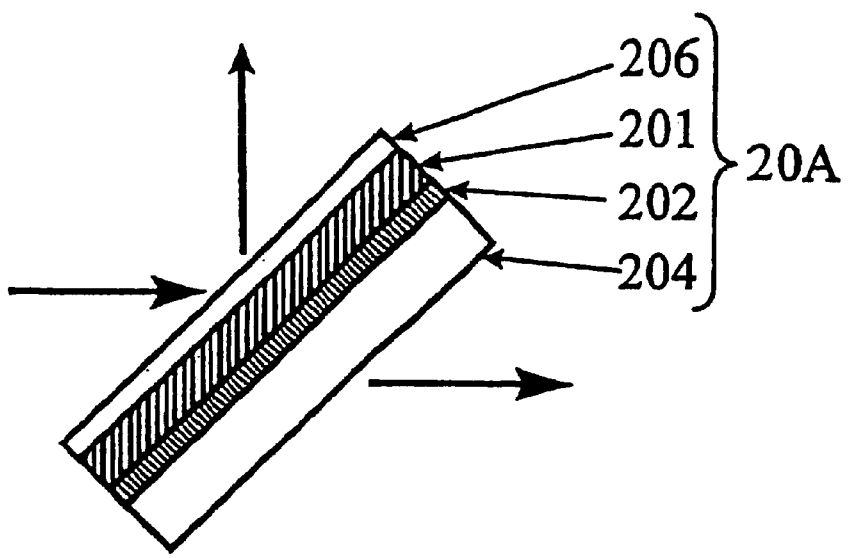
FIG. 5 is a cross-sectional view showing an example of the structure of the reflection type retarder according to a fourth embodiment of the present invention.

FIG. 5 shows a retarder 20A, in cross-section, according to a fourth embodiment of the present invention. A reflection type retarder comprises a thin film of organic material 201 having birefringent properties, which has a surface fixed to a fixing substrate 204 having a reflecting function by an adhesive 202. Further, on the other surface of the thin film of organic material 201, an anti-reflection film 206 is provided. In the reflection type retarder, since incident light is reflected by the fixing substrate to pass twice through the thin film of organic material, the film thickness of the thin film of organic material can be reduced to about half in comparison with a transmitting type retarder. Further, the thin film of organic material 201 can be so formed that when laser light from a semiconductor laser source or the like is incident perpendicularly and transmits therethrough, a phase difference of $m\pi/4$ (m is a natural number) is produced with respect to the transmitting light, and when the light is reflected by the fixing substrate 204, a phase difference of $m\pi/2$ is produced with respect to the reflected light.

As the fixing substrate 204 having a reflecting function used for the reflection type retarder 20A according to this embodiment, such one comprising an optical glass having a smooth surface on which a thin film of metal such as aluminum or a multi-layer thin film made of dielectric materials such as $TiO_2/SiO_2$ or $Ta_2O_5/SiO_2$, may be used. Further, in the film structure comprising the multi-layer thin film made of dielectric materials, a dichroic mirror which reflects light having a specified wavelength band region to bend the optical axis 90°, and to allow light having another wavelength band region to pass through, may be used.

Figure 6:
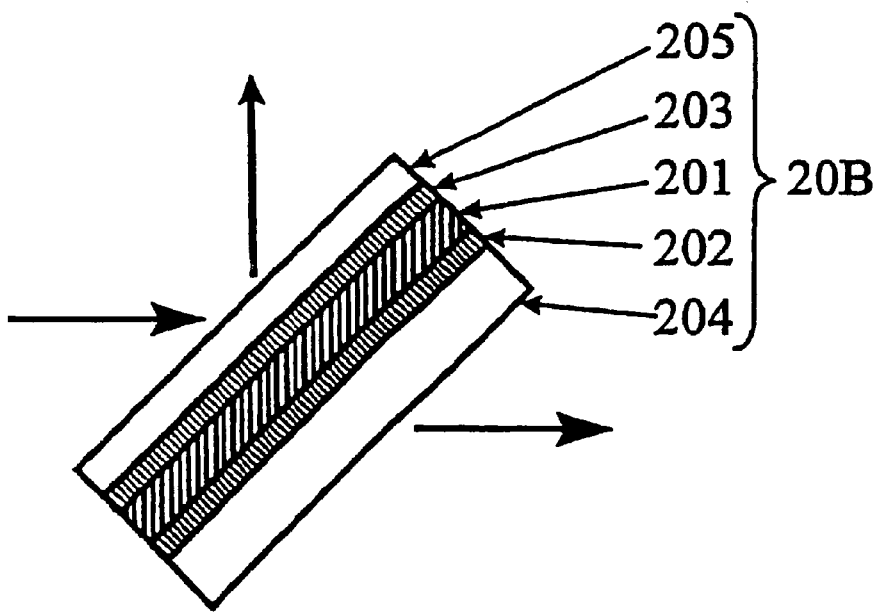
FIG. 6 is a cross-sectional view showing another example of the structure of the reflection type retarder according to the fourth embodiment of the present invention.

FIG. 6 shows a retarder 20B according to another constitution example of this embodiment. It has such structure that instead of the non-reflective coat 206 provided on one surface of the thin film of organic material shown in FIG. 5, an optical cover glass as a smooth fixing substrate 205 provided with an anti-reflection film (not shown) is bonded by an adhesive 203, so that the wavefront aberration resulted from the surface roughness of the thin film of organic material 201 can be reduced. Reference numeral 203 designates an adhesive and reference numeral 204 designates a fixing substrate.

Figure 7:
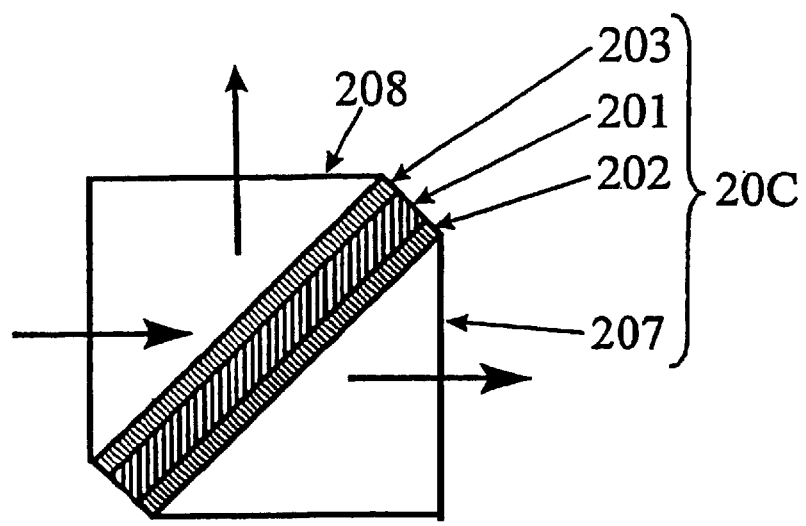
FIG. 7 is a cross-sectional view showing another example of the structure of the reflection type retarder according to the fourth embodiment of the present invention.

FIG. 7 shows a retarder 20C according to another constitution example of this embodiment. In this embodiment, each shape of an optical cover glass 208 and a fixing substrate 207 having a reflecting function is in a prism-like shape. When a flat plate-like substrate having parallel surfaces is used, astigmatism is produced in proportion to the thickness of the substrate with respect to divergent or convergent incident light. However, by providing such prism-like structure, occurrence of the astigmatism can be suppressed. The other same reference numerals as in FIG. 6 designate the same elements as in FIG. 6.

When the retarders according to the fourth embodiment are used for an optical head device for recording or reproducing information in an optical disk such as CD, DVD or the like, arrangement should be made so that light emitted from a semiconductor laser source is incident obliquely to the thin film of organic material 201. By using a thin film of organic material producing a phase difference having a value in the vicinity of $(2p-1)\pi/2$ (p is a natural number) in a case that laser light is incident perpendicularly to the thin film of organic material and emits after being reflected by the fixing substrate, linearly polarized laser light incident obliquely is reflected by the retarder to and emits in a form of circularly polarized light.

Further, when the direction of the fast axis of the retarder and the direction of the linearly polarized light emitted from a semiconductor laser source are in a specified relation, a substantially constant phase difference, which does not substantially rely on an incident angle to the retarder, is preferably obtainable. For example, when laser light having a wavelength of 650 nm is used, the thin film of organic material 201 is fixed to the fixing substrate by adjusting the direction of the fast axis of the thin film with respect to the direction of the linear polarization of the incident light so that the ellipse ratio angle indicating a state of polarization of reflected light from the retarder is about 45° irrespective of an incident angle. With such arrangement, the emitted light reflected by the retarder produces a phase difference of $(2p-1)\pi/2$ (p is a natural number) whereby linearly polarized light can be converted into circularly polarized light.

Here, the ellipse ratio angle means a defined by $\tan\alpha = \pm b/a$ ($-45° \leq \alpha \leq 45°$) where a is a long-axis amplitude intensity and b is a short-axis amplitude intensity of elliptically polarized light. In particular, by selecting the thin film of organic material having a predetermined retardation value with respect to a specified wavelength, a reflection type retarder which provides a phase difference of $5\pi/2$ with respect to light having a wavelength band of 650 nm for DVD and a phase difference of $2\pi$ with respect to light having a wavelength band of 790 nm for CD, can be formed.

Namely, when any of the retarders according to this embodiment is assembled in an optical head device using light having two different wavelengths, light having a certain wavelength reflected by the retarder is rendered to be circularly polarized light and light having the other wavelength is rendered to be linearly polarized light by adjusting the retardation value of the thin film of organic material. Accordingly, by arranging the retarder of this embodiment between the polarizing diffraction element and the optical disk, there are obtainable the features as follows. Namely, with respect to light having a wavelength band of 650 nm, a high efficiency of utilization of light can be obtained because the retarder functions as a polarizing diffraction element which allows to transmit in a going path and diffracts the light in a returning path, and with respect to light having a wavelength band of 790 nm, there is little influence of the birefringence of an optical disk because it transmits through the polarizing diffraction element in going and returning paths irrespective of a state of polarization.

Embodiment 5

Figure 8:
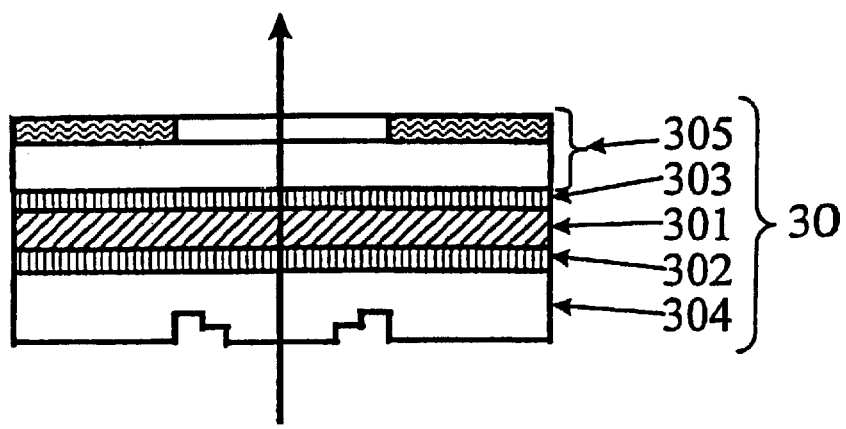
FIG. 8 is a cross-sectional view showing the structure of the optical element according to a fifth embodiment of the present invention.

FIG. 8 is a cross-sectional view showing the structure of an optical element according to a fifth embodiment of the present invention. A thin film of organic material 301 having birefringent properties is fixed by adhesives 302, 303 between a transparent substrate 305 having an aperture controlling function and a transparent substrate 304 having a wavefront aberration correcting function, whereby an optical element 30 having an aperture controlling function and a wavefront aberration correcting function is formed. The wavefront aberration to be corrected includes coma aberration, astigmatism, spherical aberration and so on.

For recording/reproducing CD, an optical disk having a thickness of 1.2 mm, a semiconductor laser having a wavelength band of 790 nm and an objective lens having NA (numerical aperture) of 0.45–0.5 is used, and for recording/reproducing DVD, an optical disk having a thickness of 0.6 mm, a semiconductor laser having a wavelength band of 650 nm and an objective lens having NA of 0.6 is used. In a case of conducting recording/reproducing of CD and DVD by using a single objective lens, an aperture limiting element for switching NA depending on light having a wavelength for CD and light having a wavelength for DVD is required. Namely, the aperture limiting element is to transmit rectilinearly light having wavelengths for both DVD and CD in a region of NA=0.45; to transmit rectilinearly only light for DVD in a peripheral region surrounding NA=0.45, and to prevent light for CD from transmitting.

Further, in a case of reading information in an optical disk of CD or DVD by using a same photodetector, an aberration correcting element is needed because the spherical aberration caused by a difference in thickness of optical disks remains. In the optical element 30 according to this embodiment, the fixing substrates constituting the retarder possess an aperture controlling function and an aberration correcting function which are required in a case of conducting recording/reproducing information in optical disks having different specifications such as CD, DVD by using a single objective lens. Accordingly, miniaturization and high-performance can be realized in the optical head device without increasing the number of structural elements.

The transparent substrate 305 having an aperture controlling function comprises a transparent material such as glass, which has a first region as a central portion and a second region surrounding the central portion wherein a periodic grating having a concave and convex shape in cross section is formed directly in a thin film or in a surface of the transparent substrate in the second region. By adjusting the amplitude of phase caused by the concave and convex shape, it is possible to transmit or diffract a predetermined wavelength selectively. Specifically processing of the concave and convex shape is conducted so that the phase difference caused by the concave and convex shape is integral multiples of $2\pi$ with respect to a wavelength for DVD and non-integral multiples of $2\pi$ with respect to a wavelength for CD, whereby light having a wavelength for DVD is allowed to transmit and light having a wavelength for CD is diffracted. Thus, the aperture limiting function is given to the transparent substrate 305 so that light is not converged to an information-recording portion in the optical disks.

The transparent substrate 304 having a wavefront aberration correcting function comprises a glass substrate or the like, and it functions by forming a groove directly or in the thin film formed on a surface of the transparent substrate in the first region wherein the groove has a two-dimensionally distributed depth depending on a quantity of aberration to be corrected so that a distribution of phase difference is produced spatially. FIG. 8 shows the transparent substrates 304 and 305 each having a different function. However, it is possible to form simultaneously in the same surface of the same transparent substrate a groove for producing a wavefront aberration correcting function and a periodical concave/convex-like diffraction grating for producing an aperture controlling function. In this case, it is possible to simplify steps for processing.

Embodiment 6

FIG. 9 shows a cross-sectional view and a plan view showing the structure of an optical element according to a sixth embodiment. FIG. 9(a) shows an optical element 40A wherein a thin film of organic material 401 having birefringent properties is fixed to a transparent substrate 405 having a diffracting function by an adhesive 403, and an antireflection film 406 is formed on the other surface of the thin film of organic material 401. FIG. 9(b) shows, as another constitution example, an optical element 40B wherein a thin film of organic material 401 having birefringent properties is fixed between a transparent substrate 405 having a diffracting function and a transparent substrate 404 coated with an antireflection film 406 by adhesives 402, 403. FIG. 9(c) is a plan view of the optical element of FIG. 9(c) and FIG. 9(b) viewed from an upper side.

The transparent substrate 405 having a diffracting function comprises a transparent material such as glass. A periodic grating having a concave and convex shape in cross section or a hologram is formed directly or in a thin film formed on a surface of the transparent substrate. It is preferable to provide an antireflection film to prevent a loss of reflection of light at the interface between air and the transparent substrate 405 having a diffracting function.

With such multi-layered plate structure using the transparent substrates and the thin film of organic material, the retarder having a diffracting function can be formed. The optical element having a diffracting function according to this embodiment can be used as, for example, a 3-beam generating element for detecting signals in a 3-beam method or a differential push-pull method or the like. Since the diffraction element used for a signal detecting system such as the 3-beam method or the differential push-pull method is located in the vicinity of incident light from a laser light source, it can be a small element. Further, incident light to the diffraction element becomes divergent light. The optical element of this embodiment provides a phase difference producing function while it is as small as the conventional diffraction element. Further, since the retarder having the thin film of organic material can suppress the fluctuation of the retardation value with respect to incident divergent light, it is possible to stabilize a state of polarization of laser light.

In particular, since a thin film of organic material producing a phase difference of $\pi/2$ is used for an optical head device mounting a high-power laser light source for recording CD-R or the like, the polarized plane is rotated 90° by going and returning light between the surface of the optical disk and the emitting point of laser light through the thin film of organic material. Accordingly, a stable signal intensity of laser can be obtained without causing interference between the oscillated light and the returning light, with the result that stable recording of information in the optical disk can be realized.

Embodiment 7

In the optical head device according to a seventh embodiment of the present invention, a light source emitting laser light having two or more different wavelengths is used, and a broadband retarder for controlling a state of phase of the laser light having two or more different wavelengths is located between the light source and an objective lens.

Figure 10A:
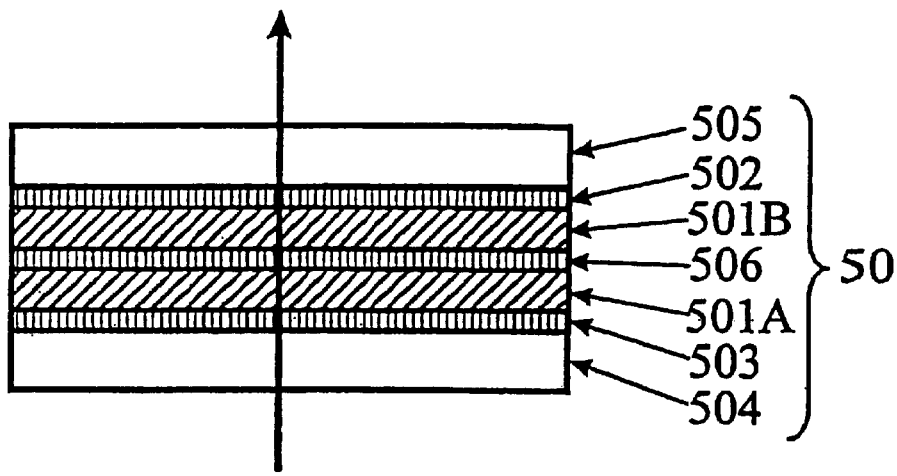
FIGS. 10(a) and 10(b) are diagrams showing the structure of the broadband phase plate according to a seventh embodiment of the present invention wherein (a) is a cross-sectional view in a state that two phase plates are piled up, and (b) is a plan view showing an angular relation of each optical axis of the two piled phase plates.

FIG. 10(a) is a cross-sectional view showing such broadband retarder 50. Two phase plates 501A and 501B each comprising a thin film of organic material having birefringent properties are piled up between transparent substrates 504, 505 so that the respective optical axes are crossed, and each of the members is fixed by using adhesives 502, 503 and 506. It has such construction that the retardation value of the phase plate 501A to which laser light is first incident is larger than the retardation value of the phase plate 501B to which the laser light is secondly incident, and the ratio of these retardation values is 1.8–2.2. With this structure, the broadband retarder functions as a quarter-wave plate which provides a phase difference of about $\pi/2$ with respect to linearly polarized laser light of any wavelength transmitting therethrough whereby linearly polarized light is rendered to be substantially circularly polarized light.

In the following, description will be made as to a case that the number of emitted laser light having different wavelengths is two. A typical combination of phase difference in the two phase plates constituting the broadband retarder and a typical arrangement of the fast axis will be described.

Assumed that retardation values produced by the piled phase plates 501A and 501B wherein laser light is incident first to the phase plate 501A and 501B secondly, are respectively $R_1$ and $R_2$. Further, definition is made so that laser light having a shorter wavelength between two different wavelengths is represented by $\lambda_L$; laser light having a longer wavelength is represented by $\lambda_H$, and a wavelength $\lambda$ having a relation of $\lambda_L \leq \lambda \leq \lambda_H$; is an intermediate wavelength between the two-wavelengths $\lambda_L$ and $\lambda_H$.

In this case, the wavelength $\lambda$ is about two times of $R_1$ and about four times of $R_2$; the ratio of the retardation values $R_1/R_2$ is 1.8–2.2, and the optical axes of these two phase plates are crossed to each other. It is preferable that the crossing angle is 45–75°. Then, the above-mentioned effect, i.e. linearly polarized light being rendered to be substantially circularly polarized light, is obtainable.

On the other hand, when the retardation value R1 of the phase plate to which laser light in the two kinds of laser light is incident first is larger than the retardation value R2 of the phase plate to which laser light is incident secondly; the ratio of the retardation values is 2, and each elliptical polarization produced when the two kinds of laser light transmit through the broadband phase plate 50 is equal to each other, namely, relations in formulae (2a) and (2b) are established, it is preferable because efficiency of utilization of light becomes equal with respect to usable light having either wavelength. In the formulae, the retardation dispersion coefficient of the laser light having a shorter wavelength is represented by $k_L$ and that of a longer wavelength is represented by $k_H$.

$$R_1=(\lambda_L\cdot\lambda_H)/(2\cdot(k_L\cdot\lambda_H+k_H\cdot\lambda_L)) \quad (2a)$$

$$R_2=(\lambda_L\cdot\lambda_H)/(4\cdot(k_L\cdot\lambda_H+k_H\cdot\lambda_L)) \quad (2b)$$

Here, the retardation values of the first and second phase plates generally have wavelength dependence. When A, B and C indicate respectively dispersion coefficients which depend on materials, it is represented by $R=A+B/(\lambda-C)$ approximately. Further, the dispersion coefficients $k_L$ and $k_H$ are defined as in formulae (3a) and (3b) respectively. Here, a numerical value 589 means the wavelength of a D-line of sodium used as the standard wavelength for measuring the retardation values.

$$k_L=R(\lambda_L)/R(589)=\{A+B/(\lambda_L-C)\}/\{A+B/589-C\} \quad (3a)$$

$$k_H=R(\lambda_H)/R(589)=\{A+B/(\lambda_H-C)\}/\{A+B/589-C\} \quad (3b)$$

The two kinds of laser light incident into the broadband retarder have the same direction of linearly polarized light with respect to the direction of the linearly polarized light, the direction of the fast axis in optical axes of one phase plate indicates an angle of 10–20°, and the direction of the fast axis in optical axes of the other phase plate indicates an angle of 70–80°. At these angles, the wavelength dependence of the ellipse ratio angle is small, namely, the ellipse ratio angle does not largely change depending on wavelengths. The effect of preventing such change is not influenced even in case that the angle in the first phase plate to which light is incident first is 10–20° and the angle in the second phase plate is 70–80, or even in a case that the angle in the first phase plate is 70–80° and the angle in the later one is 10–20°.

In the following, detailed description will be made as to these angles. Assumed that angles formed between the direction of the linear polarization of incident laser light and the respective lead axes of the two phase plates are respectively $\theta_1$ and $\theta_2$ in the order of phase plates to which laser light is successively incident. When the wavelength $\lambda$ is about two times of R1 and about 4 times of $R_2$, namely, relations of $R_1=\lambda/2$ and $R_2=\lambda/4$ establish substantially, the ellipse ratio angles can be calculated as the functions of $\theta_1$ and $\theta_2$.

Figure 11A:
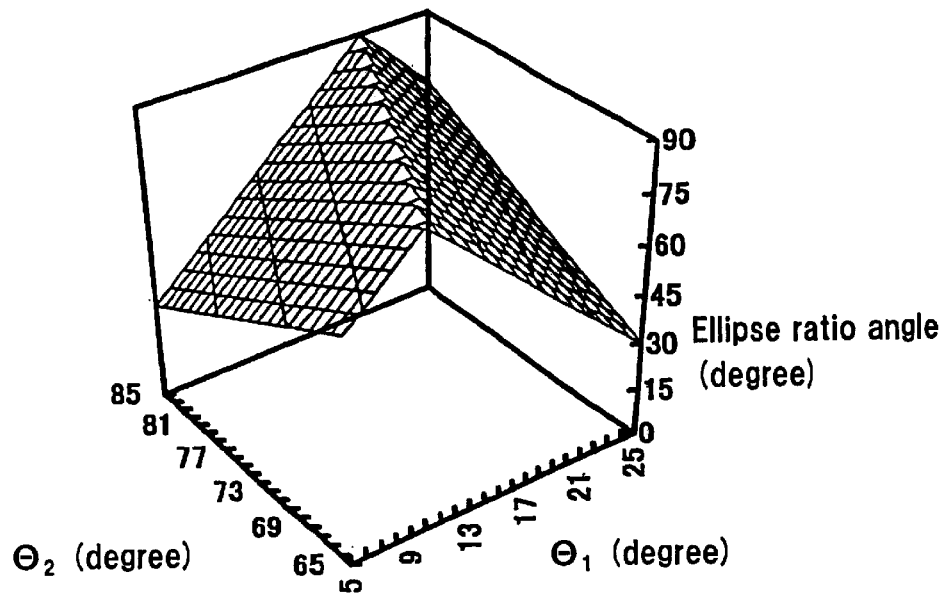
FIGS. 11(a) and 11(b) are graphs showing changes of the ellipse ratio angle of transmitted light vs. set angles ($\theta_1$, $\theta_2$) of the broadband phase plate of the seventh embodiment of the present invention wherein (a) is a graph in a case that $\theta_2$ is larger than $\theta_1$, and (b) is a graph in a case that $\theta_1$ is larger than $\theta_2$.
Figure 11B:
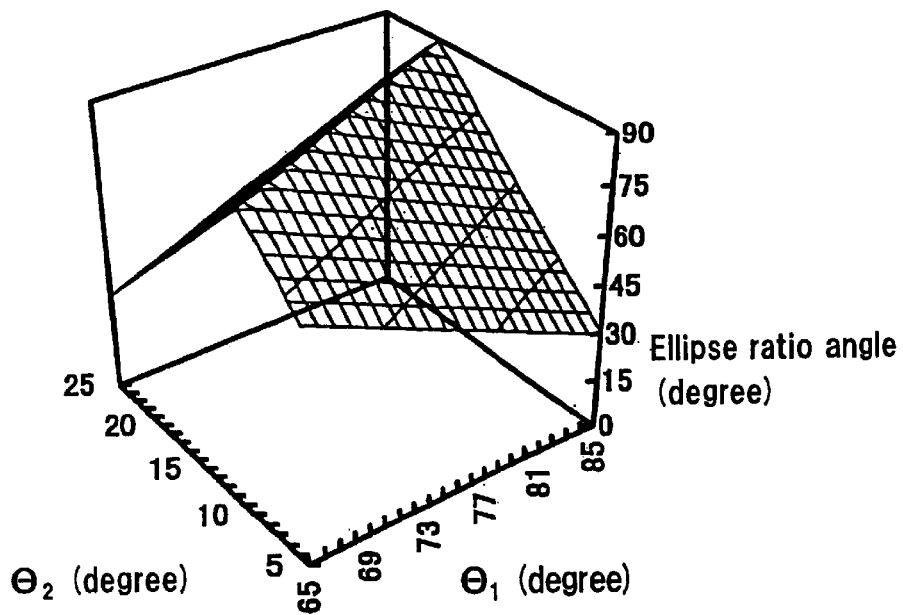

FIG. 11 shows the ellipse ratio angles wherein a ridge formed by two inclined planes satisfies the condition that the ellipse ratio angle is substantially 90°. FIG. 11(a) is a graph in which the ridge is represented by Formula (4a) where $\theta_2$ is larger than $\theta_1$, and FIG. 11(b) is a graph in which the ridge is represented by Formula (4b) where $\theta_1$ is larger than $\theta_2$. Under the conditions of Formulae (4a) and (4b), the broadband phase plate functions substantially as a quarter-wave plate.

$$\theta_2=2\times\theta_1+\pi/4 \quad (4a)$$

$$\theta_1=2\times\theta_2+\pi/4 \quad (4a)$$

If the wavelength of usable laser light is completely in coincidence with a designed wavelength, and $\theta_1$ and $\theta_2$ are in an angular relation to satisfy Formula (4a) or Formula (4b), completely circularly polarized light of transmitted light is obtainable. However, when the wavelength deviates slightly from the designed wavelength, and when relations described in Formulae (5a), (5b) are established even though $\theta_1$ and $\theta_2$ have a combination of angle satisfying the relation of Formula (4a) or Formula (4b), the transmitted light becomes closest to circularly polarized light. The unit of the angle is degree in any relational formula.

$$(\theta_1, \theta_2)=(15, 75) \quad (5a)$$

$$(\theta_2, \theta_2)=(75, 15) \quad (5b)$$

From the above, it is in particular preferable that $\theta_1$ and $\theta_2$ have angles given by Formula (5a) or Formula (5b), or they have angles in the vicinity of these angles in a range of ±5°. For example, with respect to Formula (5a), $(\theta_1, \theta_2)=(10-20, 70-80)$ is given as described above.

Figure 12:
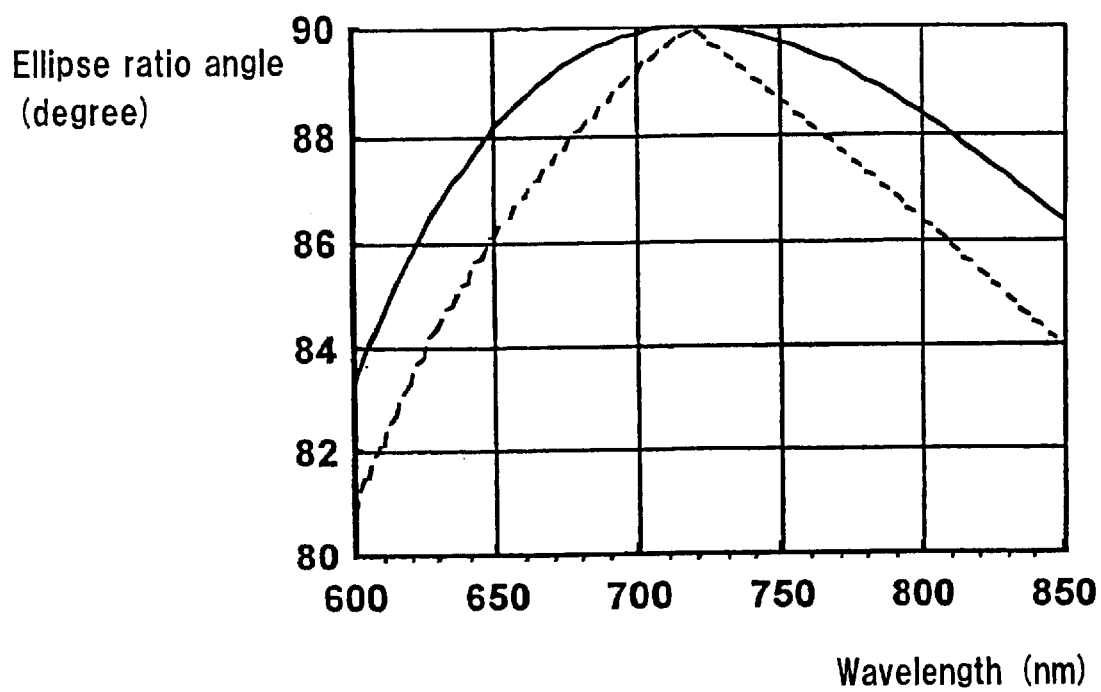
FIG. 12 is a graph showing the wavelength dependence vs. the ellipse ratio angle of transmitted light in the broadband phase plate of the seventh embodiment of the present invention.

FIG. 12 shows the wavelength dependence of transmitting light to the ellipse ratio angle in a case of $(\theta_1, \theta_2)=(15, 75)$ and $(10, 65)$ among various combinations of the angles of $\theta_1$ and $\theta_2$ satisfying Formula (4a). It is found in FIG. 12 that completely circularly polarized light can be obtained because the ellipse ratio angle is 90° in a designed wavelength (718 nm), and the change of the wavelength dependence in $(\theta_1, \theta_2)=(15, 75)$ (solid line) is smaller than the change of the wavelength dependence in $(\theta_1, \theta_2)=(10, 65)$ (broken line).

Further, in FIG. 12, as the wavelength of laser light used is apart from the designed wavelength, the ellipse ratio angle shifts from 90° whereby transmitted light becomes a form of elliptically polarized light. In the elliptically polarized light, it is estimated that with respect to a combination of, for example, a wavelength band of 400 nm used for an optical disk of high density recording and a wavelength band of 790 nm used for CD, polarized light is largely changed from circularly polarized light even when any wavelength is used.

The change from the circularly polarized light, when a polarizing diffraction element is used as a beam splitter for instance, deteriorates the diffraction characteristics in a returning path to thereby reduce a reproduced signal intensity of reflected light from the optical disk. Accordingly, such change is problematic in the optical head device. The wavelength usable actually in the optical head device does not cover the entire wavelength band region including two-wavelengths from the laser light source, but covers only two kinds of wavelength, and therefore, only the polarizing performance with respect to the two-wavelengths is in question. Accordingly, in the present invention, the relation of the directions of lead axes of the two phase plates was determined so that the ellipse ratio angle became the maximum with respect to the two-wavelengths used.

Figure 13A:
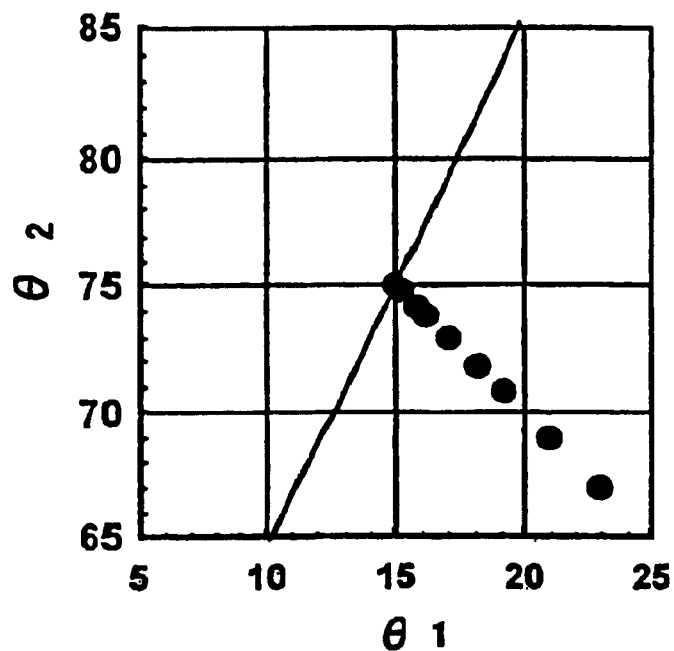
FIGS. 13(a) and 13(b) illustrate graphs showing set angles ($\theta_1$, $\theta_2$) of the broadband phase plate of the seventh embodiment of the present invention in a case that the phase plate functions as a quarter-wave plate with respect to light having two different wavelengths wherein (a) is a graph in a case that $\theta_1=15+a$ and $\theta_2=75-a$ where a is 10° or less, and (b) is a case that $\theta_1=75-a$ and $\theta_2=15+a$ where a is 10° or less.
Figure 13B:
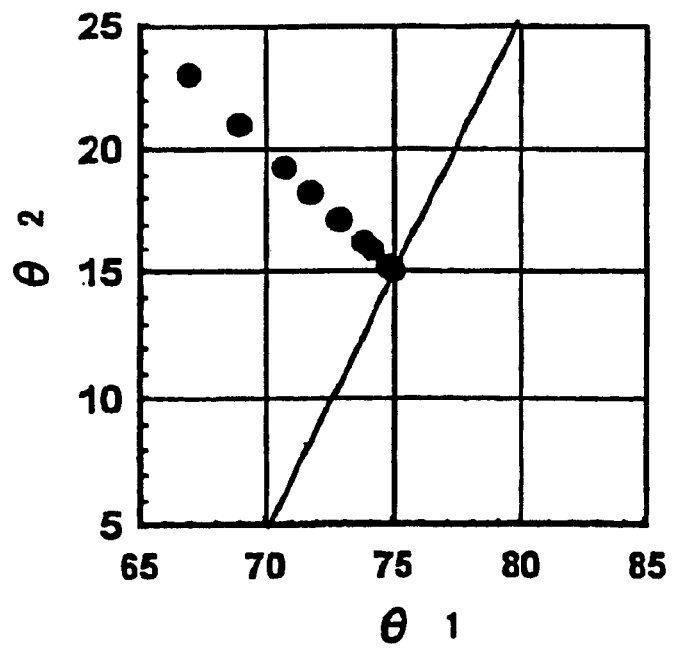

The oblique solid line in FIG. 13(a) indicates Formula (4a) and the oblique solid line in FIG. 13(b) indicates Formula (4b). As shown by black circles in FIG. 13(a) and FIG. 13(b), $\theta_1$ and $\theta_2$ functioning as a complete quarter-wave plate for two usable wavelengths satisfy the relation of Formula (6a) (FIG. 13(a)) or Formula (6b) (FIG. 13(b)).

$$(\theta_1, \theta_2)=(15+a, 75-a) \quad (6a)$$

$$(\theta_1, \theta_2)=(75-a, 15+a) \quad (6b)$$

where a is a positive coefficient determined by the interval between two usable wavelengths. Table 1 shows $\theta_1$ and $\theta_2$ on which Formula (6b) is established under a condition 1 (a=0) and a condition 2 (a=3.2), and $R_1$ and $R_2$ at these angles.

TABLE 1

| | $\theta_1$ (degree) | $\theta_2$ (degree) | a (degree) | $R_1$ (nm) | $R_2$ (nm) |
|---|---|---|---|---|---|
| Condition 1 | 75.0 | 15.0 | 0.0 | 260 | 130 |
| Condition 2 | 71.8 | 18.2 | 3.2 | 260 | 130 |

Figure 14:
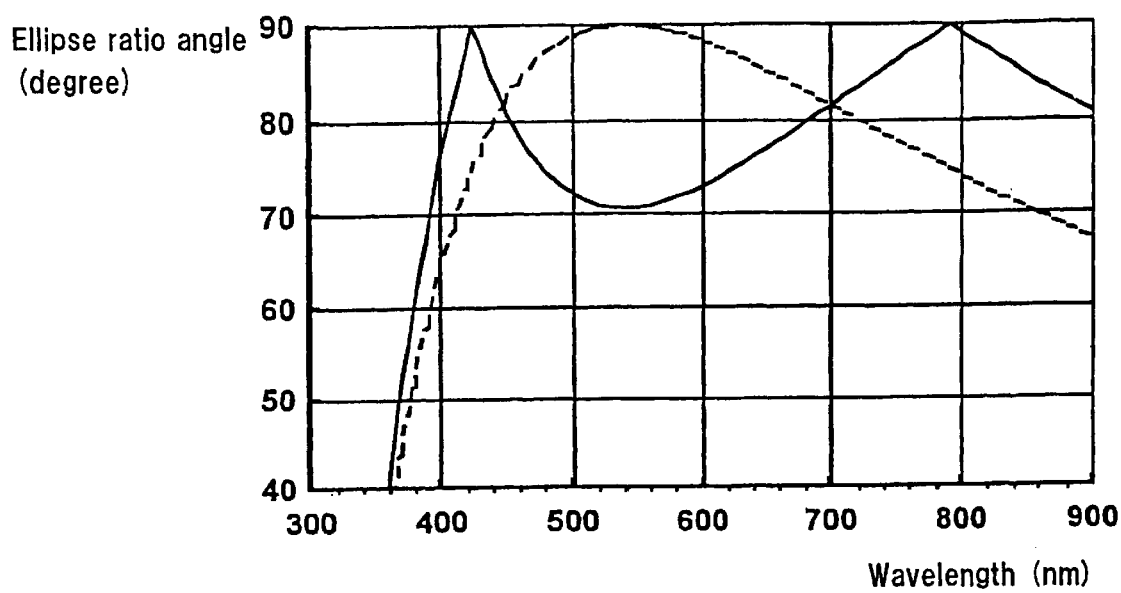
FIG. 14 is a graph showing the wavelength dependence of the ellipse ratio angle of transmitted light in the broadband phase plate of the seventh embodiment of the present invention (in a case of a=0 and a=3.2 in FIG. 13(b)).

FIG. 14 shows the wavelength dependence of the ellipse ratio angle of light transmitting the broadband retarder in cases of a=0 (broken line) and a=3.2 (solid line). In the determination of an appropriate rotation angle of 3.2° based on set center value of $(\theta_1, \theta_2)=(75, 15)$, the ellipse ratio angle to a used wavelength band of 425 nm and a used wavelength band of 790 nm is remarkably improved, and the ellipse ratio angle on the two used wavelength bands becomes 90° whereby completely circularly polarized light is formed. similarly, completely circularly polarized light can be obtained by determining an appropriate rotation angle even in a case of said center value of $(\theta_1, \theta_2)=(15, 5)$.

As described above, the broadband retarder can fully have function as a quarter-wave plate with respect to two-wavelengths wherein phase plates having retardation values satisfying Formulae (2a), (2b) on optional two-wavelengths are used, and the optimum a value is set to determine the directions of the lead axes of the two phase plates in this embodiment. Here, the value of a is 0.2 in a case of, for example, using two-wavelength bands of 660 nm and 790 nm, and 3.2 in a case of using a wavelength band of 425 nm and a wavelength band of 790 nm.

Accordingly, it is extremely preferable to determine the value of a so that the broadband retarder completely functions as a quarter-wave plate within a range of establishing Formula (6a) or Formula (6b) with respect to the two specified wavelengths of light, namely, the ellipse ratio angle becomes 90°.

It is preferable that the two phase plates, the fixing substrates and the adhesives in the broadband retarder are constituted by using materials as described in the first embodiment. It is preferable that for the purpose of reducing the wavefront aberration of the broadband retarder and improve the temperature characteristics and reliability, the adhesives for bonding should be thin as possible. It is in particular preferable that the thickness of adhesive layers is 10 μm or less.

The broadband retarder according to this embodiment can be used solely. However, when it is unified by laminating on another optical element used in the optical head device, it is possible to minimize the number of elements, simplify assembling work for the optical head device, and make the device small. Accordingly, it is preferable that the broadband retarder is unified with at least one optical element to change the optical characteristics of laser light. Specifically, the optical elements described in the third to sixth embodiments are mentioned.

The broadband retarder of this embodiment provides in particular remarkable effect when it is used in an optical head device having an optical element utilizing a difference of polarization properties, and is suitable as a part for an optical head device used for recording/reproducing information to achieve miniaturization and weight-reduction.

Figure 15:
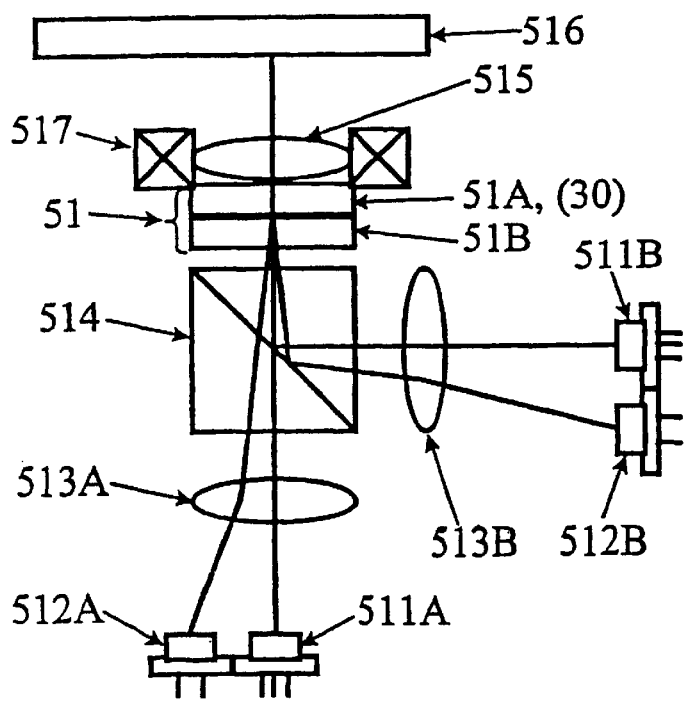
FIG. 15 is a diagram showing an example of the structure of an optical head device in which the broadband phase plate of the seventh embodiment of the present invention is installed.

In an optical head device shown in FIG. 15, an optical element 51 formed by unifying a polarizing hologram 51B with a quarter-wave plate 51A is attached to an objective lens 515 mounted on an actuator 517. The quarter-wave plate 51A used here is the broadband retardation plate of the present invention. Laser light emitted respectively from a semiconductor laser source 511A having a wavelength band of 660 nm and a semiconductor laser source 511B having a wavelength band of 790 nm are made parallel by collimater lenses 513A and 513B respectively, and transmit the polarizing hologram 51B and the quarter-wave plate 51A through a beam splitter prism 514 to be converged on the information recording surface of an optical disk 516 by means of the objective lens 515.

Reflected light including information recorded in the optical disk 516 propagate in the reverse direction through respective paths. Returning light transmitting through or reflected by the beam splitter prism 514 pass through the collimater lenses 513A, 513B respectively, and detected by a photodiode 512A for a wavelength band of 660 nm and a photodiode 512B for a wavelength band of 790 nm respectively.

In the structure shown in FIG. 15, when a polarizing hologram which is optimized to laser light having either wavelength between the two-wavelengths or which is optimized to laser light having a wavelength of intermediate value between the two-wavelengths is used, a high transmittance property is exhibited in a going path, and a reduction of efficiency in question does not take place in a returning path with respect to light having either wavelength.

Embodiment 8

Figures 16A, 16B:
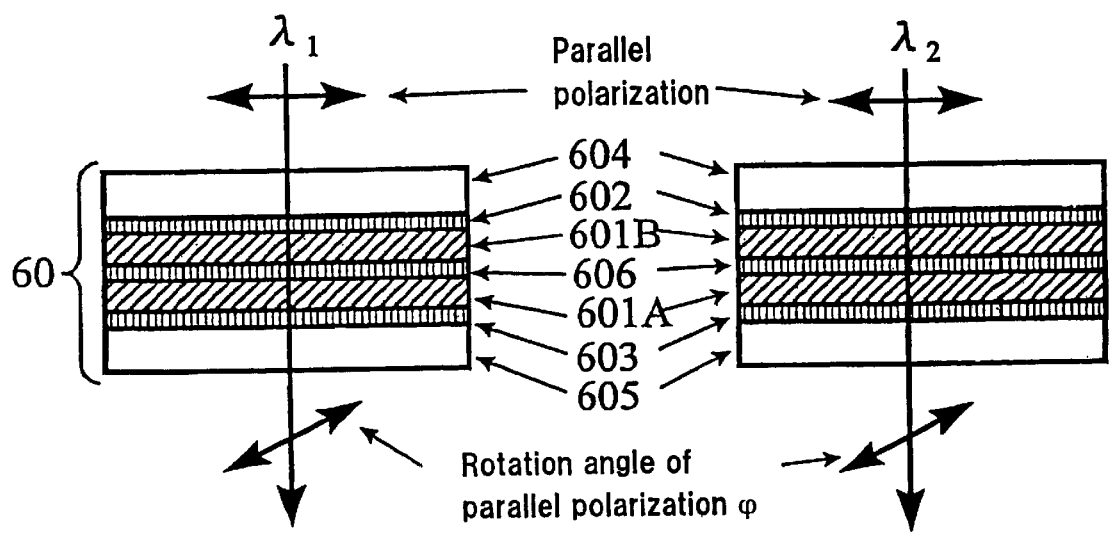
FIGS. 16(a) and 16(b) illustrate cross-sectional views showing the structure of the retarder according to an eighth embodiment of the present invention wherein (a) is a diagram showing a state of the rotation of the polarization direction in the incidence of linearly polarized light having a wavelength and (b) is a diagram showing a state of the rotation of the polarization direction in the incidence of linearly polarized light having another wavelength.

FIG. 16 is a cross-sectional view showing the structure of a retarder 60 according to an eighth embodiment of the present invention. The retarder 60 is formed by piling phase plates 601A and 601B each comprising a thin film of organic material having birefringent properties with respective optical axes being crossed, between transparent substrates 604 and 605, each of the above-members being fixed by using adhesives 602, 603 and 606, in the same manner as the structure of the broadband retarder of the seventh embodiment. It is preferable that the two phase plates, the fixing substrates and the adhesives in the retarder are materials described in the first embodiment.

The phase plates 601A and 601B have the same retardation value, and the phase plates 601A and 601B are piled up each other so that the respective optical axes are crossed. When linearly polarized light having wavelengths of $\lambda_1$ and $\lambda_2$ ($\lambda_1 < \lambda_2$) enter into the retarder 60, the planes of polarized light of respective linearly polarized light rotate by the same angle. The retardation values $R_d$ of the respective phase plates have the same value, and $R_d = \lambda/2$ in linearly polarized light having a wavelength $\lambda$ in a relation of $\lambda_1 \leq \lambda \leq \lambda_2$.

In a case that a retarder is to be formed in consideration of light having a wavelength band of $\lambda_1 = 660$ nm for DVD and light having a wavelength band of $\lambda_2 = 790$ nm for CD, and phase plates having a retardation value in a range of $R_d = 330$–395 nm are used for example, good linearity maintaining properties and optical rotation performance on incident linearly polarized light can preferably obtained. The above-mentioned performance becomes maximum when $R_d$ takes an intermediate value of the above-mentioned range, i.e. about 362 nm. Further, the above-mentioned performance can be recognized even when it is smaller the $R_d = 330$ nm, e.g., about 310 nm.

The rotation angles of the two planes of polarized light of linearly polarized light produced by the retarder are the same. A rotation angle $\phi$ is given in a relation of $\phi = 180° - 2\theta$ wherein an angle $\theta$ is formed between the optical axes of the phase plates 601A and 601B. Accordingly, by adjusting the angle $\theta$ formed between the optical axis of the phase plate 601A and the optical axis of the phase plate 601B, a desired rotation angle $\phi$ can be obtained. In the retarder constituted as above, the planes of polarized light can be rotated by the same angle while keeping the linearity with respect to two different kinds of linearly polarized light even though their wavelengths are different.

Figure 17:
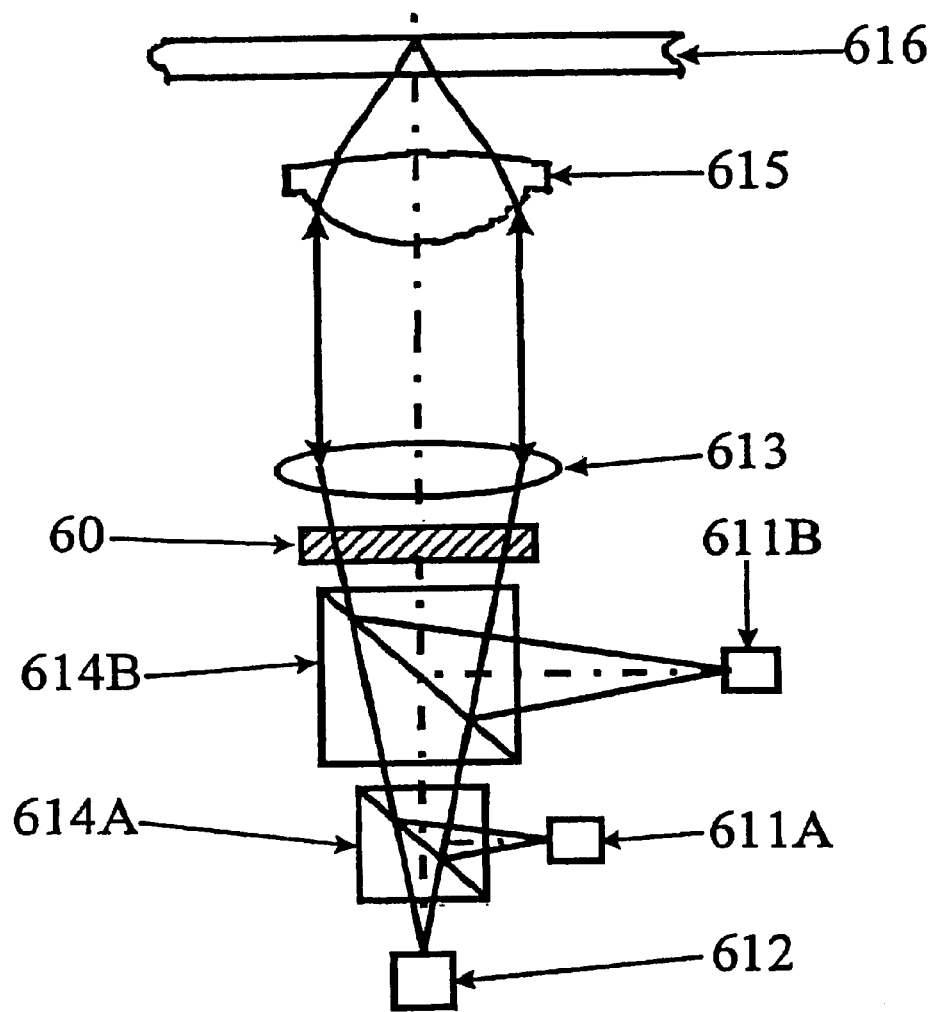
FIG. 17 is a diagram showing the structure of an optical head device in which the retarder of the eighth embodiment of the present invention is installed.

FIG. 17 is a cross-sectional view showing an constitution example of an optical head device installing the retarder according to the eighth embodiment of the present invention. Two kinds of linearly polarized light having different wavelengths emitted from semiconductor laser sources 611A and 611B are reflected by beam splitters 614A and 614B respectively, and then, transmit through the retarder 60 to be converged on the information recording surface of an optical disk 616 by means of a collimater lens 613 and an objective lens 615. After the two kinds of linearly polarized light having different wavelengths have passed through the retarder 60, their planes of polarized light are rotated by an angle $\phi$, and then, the two kinds of light are reflected by the information recording surface of the optical disk 616. The reflected light in a returning path are converged by the objective lens 615 and the collimater lens 613, and again transmit through the retarder 60. The light in the returning path transmitting through the retarder, after their planes of polarized light are made in coincidence with the planes of polarized light in the going path, are converged on a photodetector 612.

In the optical head device using the retarder of the present invention, a fluctuation in the intensity of signal light reflected by the optical disk, caused by a distribution of the birefringence remaining in the optical disk or the polarization dependence can be reduced, and stable recording and reproducing of information can be obtained.

Embodiment 9

FIG. 18 shows a cross-sectional view of the retarder 70 according to a ninth embodiment of the present invention. A phase plate 701 comprising a thin film of organic material and fixing substrates 704, 705, and they are fixed by using adhesives 702, 703. The retarder has a structure using the same materials as described in the first embodiment.

The retarder 70 is constructed as follows. Assumed that laser light having two different wavelengths $\lambda_1$ and $\lambda_2$ emitted from light sources, are incident, as linearly polarized light having the planes of polarized light which are parallel to each other, into the retarder 70. The retardation value of the phase plate is adjusted so that a phase difference of $2\pi$ $(m_1 - \frac{1}{2})$ is produced when light having a wavelength $\lambda_1$ transmits through the phase plate 701; a phase difference of $2\pi \ m_2$ is produced when light having the other wavelength $\lambda_2$ transmits through the phase plate, and the planes of polarized light of two kinds of linearly polarized light are crossed to each other where $m_1$ and $m_2$ are natural numbers, and the linearly polarized light of wavelengths $\lambda_1$, $\lambda_2$ are incident into the phase plate with an inclination in a polarization direction of 45° with respect to the direction of the fast axis (not shown) of the phase plate.

Description will be made as to a case that for example, the wavelength of laser light having a wavelength band of 660 nm for DVD is represented by $\lambda_1$ and the wavelength of laser light having a wavelength band of 790 nm for CD is represented by $\lambda_2$. A phase plate made of polycarbonate having a retardation value of $5\lambda_1/2$ ($m_1 = 3$) to linearly polarized light having a wavelength of $\lambda_1$ is arranged so that the fast axis is inclined 45° with respect to the direction of incident linearly polarized light. Then, when the linearly polarized light of a wavelength of $\lambda_1$ transmits through the phase plate, the polarization plane rotates 90°. On the other hand, the retardation value of the phase plate to the linearly polarized light of wavelength $\lambda_2$ corresponds to $2\lambda_2$ ($m_2 = 2$), and the polarization plane of the linearly polarized light of wavelength $\lambda_2$ transmitting through the phase plate does not rotate. Namely, the linearly polarized light having wavelengths of $\lambda_1$ and $\lambda_2$ whose the planes of polarized light are parallel to each other, become linearly polarized light whose the planes of polarized light cross perpendicularly after the light have transmitted through the phase plate 701.

Further, a case of using a wavelength $\lambda_1$ of 800 nm and a wavelength $\lambda_2$ of 400 nm, and a phase plate made of polycarbonate having a retardation value of $\lambda_1/2$ ($m_1 = 1$) to light having a wavelength of $\lambda_1$ which is arranged so that the fast axis is inclined 45° with respect to the direction of incident linearly polarized light is considered. When the linearly polarized light of wavelength $\lambda_1$ transmits through the phase plate, the polarization plane rotates 90°. On the other hand, the retardation value of the phase plate to the linearly polarized light of wavelength $\lambda_2$ corresponds to $\lambda_2$ ($m_2 = 1$), and the polarization plane of the linearly polarized light of wavelength $\lambda_2$ transmitting through the phase plate does not rotate. Namely, even in this case, the linearly polarized light having wavelengths $\lambda_1$ and $\lambda_2$ whose the planes of polarized light are parallel to each other, become linearly polarized light whose the planes of polarized light cross perpendicularly after they have transmitted through the phase plate 701.

Here, values taken by the natural numbers $m_1$ and $m_2$ are preferably about 3 or less. If $m_1$ and $m_2$ are about 3 or more, an elliptical polarization is produced because a change in the retardation value to a fluctuation of the laser light wavelength $\lambda_1$ or $\lambda_2$ becomes large. It is difficult to manufacture a phase plate having a large retardation value with use of a single thin film of organic material. If a plurality of thin films is laminated in order to produce such phase plate, the number of steps for manufacturing will increase.

The retarder 70 constructed as mentioned above has function to convert linearly polarized light having two different wavelengths whose the planes of polarized light are parallel to each other into linearly polarized light whose the planes of polarized light cross perpendicularly. Accordingly, light having two different wavelengths can be separated by providing different planes of polarized light.

Embodiment 10

FIG. 19 is a cross-sectional view of an optical element 71 according to a tenth embodiment of the present invention. A phase plate 701 comprising a thin film of organic material fixed to a transparent substrate 704 by an adhesive 702, and a transparent substrate 705 in which a saw-teeth like grating 706 is formed is fixed to the phase plate 701 by a filling adhesive 703 so that the saw-teeth like grating 706 opposes the phase plate 701. The phase plate 701 has the same structure and function as the retarder according to the ninth embodiment wherein linearly polarized light of two different wavelengths whose the planes of polarized light are parallel to each other transmit through the phase plate with an inclination of 45° in a polarization direction with respect to a direction of the fast axis of the phase plate, whereby the planes of polarized light of light having two different wavelengths cross perpendicularly each other. The saw-teeth like grating 706 functions as a polarizing diffraction grating which diffracts either one of the linearly polarized light of two different wavelengths whose the planes of polarized light cross perpendicularly each other and does not diffract the other.

Here, the saw-teeth like grating 706 as a polarizing diffraction grating functions so that when two kinds of light of different wavelengths are incident with their optical axes directing certain angles, only one kind of light is diffracted so that the optical axis of the one kind of light is aligned with the optical axis of the other light as shown in FIGS. 19(a) and 19(b). The saw-teeth like grating 706 is made of a birefringent material such as polymerized liquid crystal having an ordinary refractive index $n_o$ and an extraordinary refractive index $n_e$, and is prepared by the following steps. The before-mentioned polymerized liquid crystal is coated on the transparent substrate 705 in a predetermined thickness. Liquid crystal molecules are made aligned so that an orientated vector of the liquid crystal molecules in a direction of extraordinary refractive index $n_o$ of the polymerized liquid crystal is aligned in a specified direction in the surface. After the liquid crystal molecules have been polymerized by irradiating light from a photo-polymerizing light source, a saw-teeth like grating is formed by techniques of photolithography and etching. It is preferable that the saw-teeth like grating have a right triangle shape in cross section. However, it may be a step-like shape as shown in FIG. 19. In the case of the step-like shape, the larger the number of steps is, the greater efficiency of utilization of light is obtainable. In forming four or more steps, the first-order light of 70% were more can preferably be utilized.

The filling adhesive 703 is a transparent adhesive having a uniform refractive index $n_s$, and a material for the adhesive is selected so that the refractive index $n_s$ is substantially equal to the ordinary refractive index $n_o$ of polymerized liquid crystal, for example. The filling adhesive can appropriately be selected among the adhesives described in the first embodiment. The optical element 71 having the above-mentioned structure functions to convert the two kinds of linearly polarized light of different wavelengths whose the planes of polarized light are in parallel to each other into linearly polarized light whose the planes of polarized light cross perpendicularly each other; separates the two kinds of light of different wavelengths, and functions as a diffraction grating with respect to linearly polarized light of a wavelength $\lambda_2$ ($\lambda_1 \neq \lambda_2$) although it does not function as a diffraction grating with respect to linearly polarized light of a wavelength $\lambda_1$, for instance.

As another example of this embodiment, a polarizing diffraction grating for generating three beams for tracking in an optical head device may be used instead of the above-mentioned saw-teeth like grating 706, which functions as a diffraction grating to linearly polarized light of a wavelength $\lambda_1$ and does not function as a diffraction grating to linearly polarized light of a wavelength of $\lambda_2$.

As a separate example of this embodiment, an optical element comprising a transparent substrate to which a function to produce a spatial distribution of phase to the transmission wavefront is added, may be used instead of the above-mentioned saw-teeth like grating 706. With this, the wavefront of incident linearly polarized light can be controlled. For instance, when the above-mentioned polymerized liquid crystal on the transparent substrate is processed so that the layer thickness is spatially distributed, there is no change in a distribution of phase with respect to incident ordinary polarized light of a wavelength $\lambda_1$, but a distribution of phase corresponding to a distribution of layer thickness is produced with respect to incident extraordinary polarized light of a wavelength $\lambda_2$. When such retarder is mounted on an optical head device, aberration remaining by the cause of the difference of wavelength can be corrected. For example, it is effective as an compatible element between DVD and CD.

Embodiment 11

Figure 20:
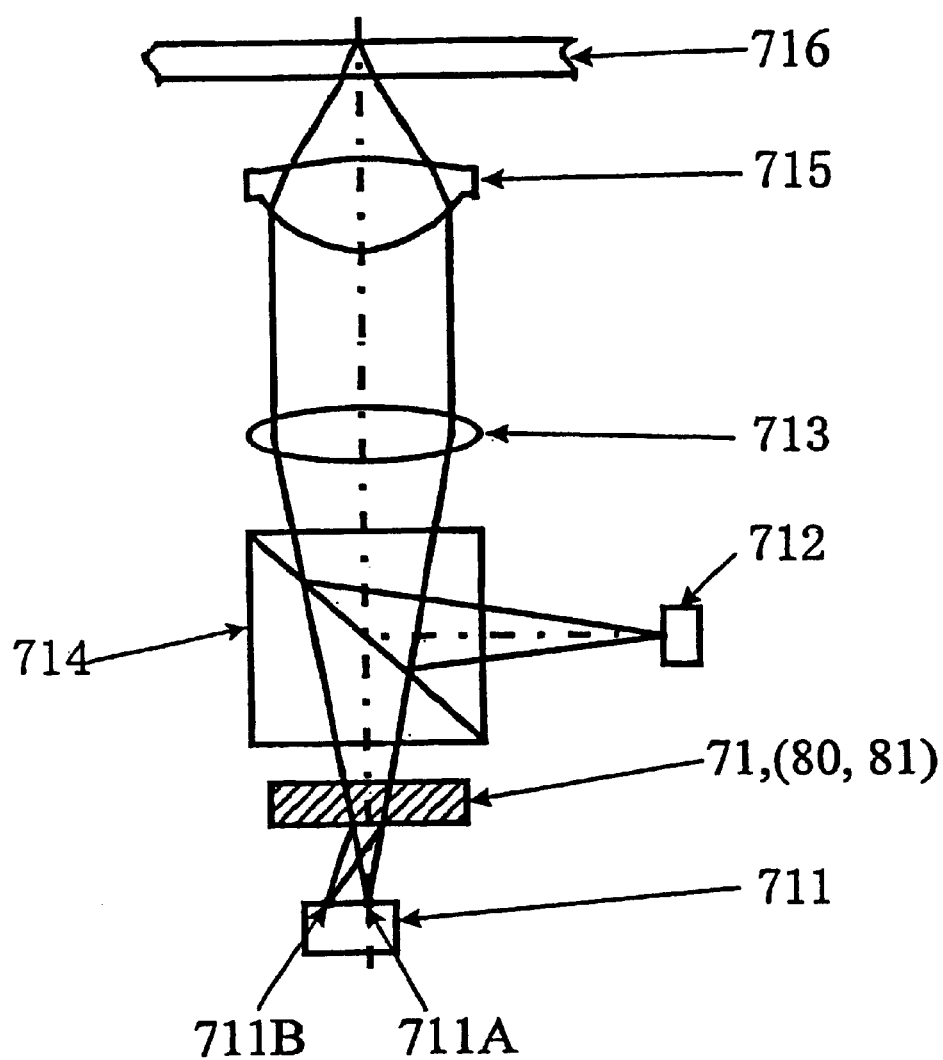
FIG. 20 is a diagram showing the optical head device according to an eleventh embodiment of the present invention.

FIG. 20 is a cross-sectional view of an optical head device according to an eleventh embodiment of the present invention. The optical head device comprises a two-wavelength semiconductor laser source 711 having two light emitting points 711A and 711B disposed with an interval to generate linearly polarized light having a wavelength $\lambda_1$ and a wavelength $\lambda_2$ ($\lambda_1 \neq \lambda_2$), whose the planes of polarized light are in parallel to each other, an optical element 71 according to the tenth embodiment, a beam splitter 714, a collimater lens 713, an objective lens 715 and a photodetector 712, to perform the recording and reproducing of an optical disk 716.

When linearly polarized light of a wavelength $\lambda_1$ is incident into the optical element 71, the polarization plane of the linearly polarized light rotates 90° by the phase plate constituting the optical element 71, and the linearly polarized light becomes ordinary light to the polymerized liquid crystal constituting a saw-teeth like grating. Accordingly, the linearly polarized light transmits straightly because the ordinary refractive index $n_o$ of the saw-teeth like grating is substantially equal to the refractive index $n_s$ of the filling adhesive ($n_o=n_s$). On the other hand, since the light emitting point which emits the linearly polarized light of a wavelength $\lambda_2$ incident into the phase plate is separated from the light emitting point which emits the linearly polarized light of a wavelength $\lambda_1$, the optical axis of the linearly polarized light having a wavelength $\lambda_1$ is inclined with respect to the optical axis of the linearly polarized light of a wavelength $\lambda_2$, and accordingly, the polarization plane of the light does not rotate even when it transmits through the phase plate whereby the linearly polarized light of a wavelength $\lambda_2$ becomes extraordinary light to the polymerized liquid crystal constituting the saw-teeth like grating. Accordingly, the saw-teeth like grating generates the + first-order diffraction light because the extraordinary refractive index $n_e$ of the saw-teeth like grating is different from the refractive index $n_o$ of the filling adhesive, and by adjusting the pitch of grating, the + first-order diffraction light having a wavelength $\lambda_2$ is emitted by being diffracted into the same axial direction as the optical axis of the light of a wavelength $\lambda_1$.

Namely, the optical head device mounting thereon the optical element 71 of this embodiment can make the optical axes of linearly polarized light having wavelengths $\lambda_1$ and $\lambda_2$ ($\lambda_1 \ne \lambda_2$) emitted from the two-wavelength semiconductor laser source coincident with each other. Accordingly, the other optical elements constituting the optical head device perform excellent optical characteristics because the optical axes of the two kinds of linearly polarized light having different wavelengths are coincident with each other, and recording and reproducing of information in an optical disk can stably be conducted. Further, since detection of signal light having wavelengths $\lambda_1$ and $\lambda_2$ can be conducted by the same photodetector, the structure of the optical head device can be simplified; the number of assembling steps can be reduced, and miniaturization and weight-reduction of the device can be realized.

Examples of the present invention will be described hereinbelow.

EXAMPLE 1

A retarder 1A as shown in FIG. 1 in cross section was prepared. Uniaxially stretched (alicyclic) polyolefin (linear expansion coefficient $E_1=6.1\times10^{-6}/°$ C., glass transition temperature $T_1=171°$ C.) was used as the thin film of organic material 101 having birefringent properties, an acrylic type adhesive (linear expansion coefficient $E_2=1.1\times10^{-4}/°$ C.) was used as the adhesives 102, 103 and glass substrates (linear expansion coefficient $E_3=95\times10^{-7}/°$ C.) were used as the fixing substrates 104, 105. The retafrdation value of the thin film of organic material was 170 nm.

As a result of using the retarder of Example 1 in an optical head device, there was no change of phase difference and the direction of retardation axis in the retarder and no disturbance of the wavefront of laser light passing through the retarder caused by a deformation of the thin film of organic material even when there was a fluctuation of the wavelength in a semiconductor laser source due to a temperature change. Accordingly, there was no disadvantage such as a reduction of detected light quantity in the photodetector, whereby good reproducing signals for information in the optical disk could be obtained. Further, the usable temperature was 150° C. or more; desired characteristics could be obtained even in a high temperature region, and there was no trouble in use.

COMPARATIVE EXAMPLE 1

A retarder was prepared as a Comparative Example of the retarder shown in FIG. 1. Uniaxially stretched polyester (linear expansion coefficient $E_1=6\times10^{-5}/°$ C.) was used as the thin film of organic material having a phase-difference producing function, an epoxy type adhesive (linear expansion coefficient $E_2=5\times10^{-5}/°$ C.) was used as the adhesives and glass substrates (linear expansion coefficient.

$E_3=95\times10^{-7}/°$ C.) were used as the fixing substrates. The retardation value of the retarder was 330 nm.

In this Comparative Example, the linear expansion coefficients $E_1$, $E_2$ and $E_3$ did not satisfy the relation of the before-mentioned Formula (1). Accordingly, as a result of using the retarder in an optical head device, a change of phase difference was caused in the retarder due to a temperature change and a disadvantage such as a reduction of detected light quantity in the photodetector was resulted. Further, at a temperature of 130° C. or more, the thin film of organic material peeled off from the fixing plates to cause the destruction of the retarder.

EXAMPLE 2

A polarizing diffraction type optical element 10 was prepared by unifying a retarder 1B with a polarizing diffraction element 2 as shown in FIG. 4. Uniaxially stretched polycarbonate (linear expansion coefficient $E_1=6.2\times10^{-6}/°$ C.) was used as the thin film of organic material 101 having birefringent properties, a polyester type adhesive (linear expansion coefficient $E_2=1.2\times10^{-4}/°$ C.) was used as the adhesives 102, 103, and glass substrates (linear expansion coefficient $E_3=95\times10^{-7}/°$ C.) were used as the fixing substrates 104, 105.

The retardation value of the thin film of organic material 101 as a single body was 812 nm and the thickness was 45 μm. Since the glass substrates 104, 105 and the adhesives 102, 103 had no birefringent properties, hence, they had no phase-difference producing function, the retardation value of the optical element 10 was 812 nm which was the same as that of the thin film of organic material 101 as a single body. Further, the transmission wavefront aberration of the optical element 10 was 0.006 λ rms and extremely excellent wavefront characteristics could be obtained.

Figure 21:
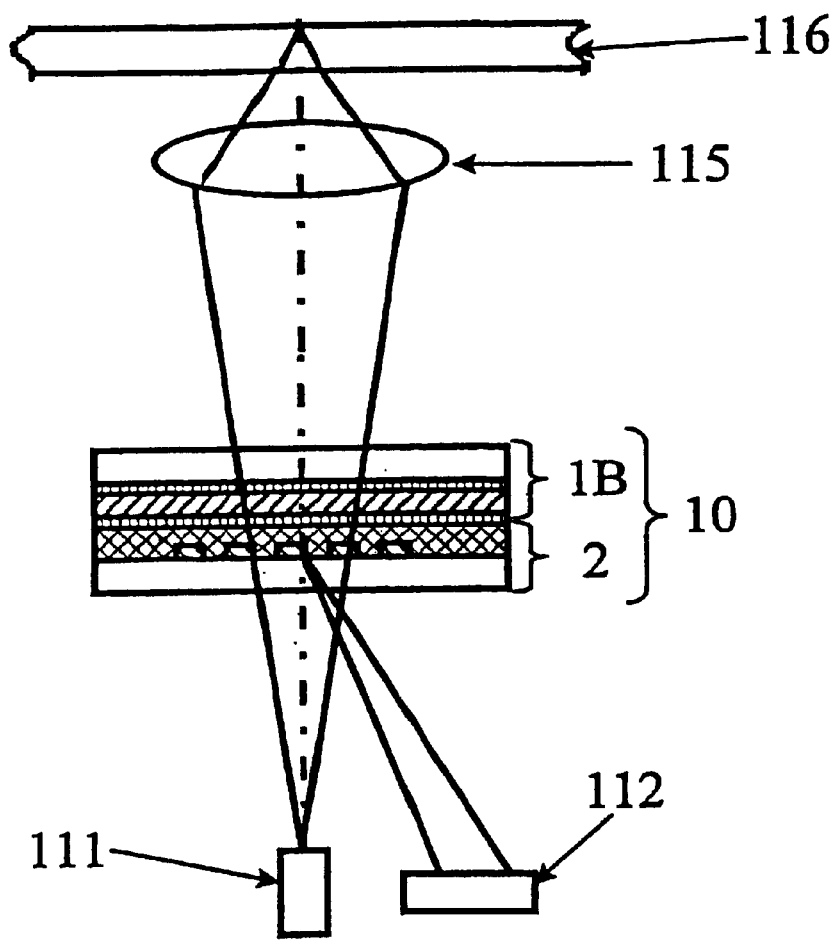
FIG. 21 is a side view showing diagrammatically the structure of an optical head device in which the polarizing diffraction type retarder shown in FIG. 4 is installed.

The optical element 10 was installed in the optical head device shown in FIG. 21. The optical element 10 formed by unifying a polarizing diffraction element 2 with a retarder 1B having a retardation value of 5λ/4 was disposed in an optical path between a semiconductor laser source 111 having an oscillated wavelength λ in a wavelength band of 650 nm and an objective lens 115, and such optical system was disposed so as to oppose to an optical disk 116. Further, a photodetector 112 was disposed in an optical path in a diffraction direction of the polarizing diffraction element 2. While light emitted from the semiconductor laser source 111 transmits through the polarizing diffraction element 2 and the retarder 1B, linearly polarized light is converted into circularly polarized light. The circularly polarized light is converged on the optical disk 116 by means of the objective lens 115, and reflected therefrom. The reflected light from the optical disk 116 transmits through the objective lens 115 and the retarder 1B, whereby the circularly polarized light is converted into linearly polarized light. The linearly polarized light is diffracted by the polarizing diffraction element 2. Then, the diffraction light diffracted by the polarizing diffraction element is received by the photodetector 112.

As a result of using the optical element 10 as a polarizing diffraction type retarder of Example 2 in the optical head device, the adhesives absorbed thermal expansions caused in the thin film of organic material and the fixing substrates of the retarder even when there was a temperature change, whereby a deformation of the retarder was prevented and a predetermined phase difference could always be obtained stably. With this, a change of phase difference, a change of the direction of retardation axis or a disturbance of the wavefront of laser light passing through the retarder did not occur. Accordingly, a disadvantage such as a reduction of detected light quantity in the photodetector did not occur and excellent reproducing signals for the optical disk could be obtained.

EXAMPLE 3

In this example, a reflection type retarder 20A as shown in FIG. 5 was prepared. The retarder 20A was prepared by using uniaxially stretched polycarbonate (linear expansion coefficient $E_1=6.2\times10^{-6}/°$ C.) as the thin film of organic material 201 having a phase-difference producing function, a polyester type adhesive (linear expansion coefficient $E_2=1.2\times10^{-4}/°$ C.) as the adhesive 202 and a glass substrate (linear expansion coefficient $E_3=95\times10^{-7}/°$ C.) with vapor-deposited aluminum in a thickness of 100 nm as the fixing substrate 204 having a reflecting function. The thickness of the thin film of organic material was 45 $\mu$m, which provided a retardation value of 408 nm (i.e., a phase difference of $5\pi/4$) to light having a wavelength band of 652 nm which entered perpendicularly into and transmitted through the thin film of organic material, and a retardation value of 816 nm (i.e., a phase difference of $5\pi/2$) which was double in value in a case of being reflected by the retarder with the thin film of organic material.

As shown in FIG. 22, when light emitted from a semiconductor laser source 211 having a wavelength band of 652 nm transmits through a polarizer 221, the light becomes linearly polarized light which is in parallel to an X axis and is incident into the retarder 20A. Here, an incident angle $\theta$ is an angle formed between a normal line set up on the retarder 20A and the X axis. In this case, adjustment was made to the retarder 20A so that the ellipse ratio angle was about 45°, and the thin film of organic material was attached to the fixing substrate 204 at an aluminum film side by using the adhesive 202 so that the direction $\phi$ of a slow axis of the thin film was at an angle of 42° to the X axis in the coordinate system shown in FIG. 22.

In the retarder thus prepared, the incident angle dependence of a phase difference of reflected light was examined. As a result, light reflected by the retarder at an incident angle of $\theta=20$–50° produced a retardation of 806–824 nm. It shifted as slight as about 9 nm at the maximum from the retardation value of 816 nm in a case of perpendicularly incident, and the phase difference of the reflected light was about $5\pi/2$ in a state of circularly polarized light.

Further, the incident angle dependence of a phase difference was examined similarly by using a semiconductor laser source having a wavelength band of 780 nm. As a result, light reflected by the retarder at an incident angle of $\theta=20$–500 produced a retardation of 779–797 nm. It shifted as slight as about 9 nm at the maximum from the retardation value of 788 nm in a case of perpendicularly incident, and the phase difference of the reflected light was about $2\pi$ in a state of linearly polarized light.

Accordingly, the retarder 20A having such reflecting function could convert linearly polarized light having a wavelength band of 650 nm entering in a wide angular range of $\theta=20$–50° into reflected light of substantially uniform circularly polarized light; rendered linearly polarized light having a wavelength band of 780 nm to be reflected light of the similar linearly polarized light, and could reduce the incident angle dependence of a phase difference to reflected light having each wavelength band.

EXAMPLE 4

An optical element 30 as shown in FIG. 8 in which an aperture controlling function and a wavefront aberration correcting function were added to the retarder was prepared. As the thin film of organic material 301 constituting the retarder, such one for producing a retardation value of $\lambda/4$ to an averaged wavelength $\lambda$ between a wavelength band of 650 nm and a wavelength band of 780 nm was used (uniaxially stretched polycarbonate, linear expansion coefficient $E_1=6.2\times10^{-6}/°$ C.). Further, a polyester type adhesive (linear expansion coefficient $E_2=1.2\times10^{-4}/°$ C.) was used as the adhesives 302, 303.

A quartz substrate (linear expansion coefficient $E_3=5\times10^{-7}/°$ C.) was used as the transparent substrate 305 having an aperture controlling function, and a periodic linear grating having a concave and convex shape in cross section was formed directly on the substrate in a peripheral region surrounding a central region including the optical axis of the transparent substrate by combining a photolithography method and an etching method. The depth of concave and convex portions was 2.9 $\mu$m so that light having a wavelength of 650 nm for DVD passed through the concave and convex portions without any diffraction, but the almost amount of incident light having a wavelength band of 790 nm for CD did not passed through.

A quartz substrate was also used as the transparent substrate 304 having a wavefront aberration correcting function, wherein a ringed belt-like groove was formed directly in a central region including the optical axis of the transparent substrate by combining a photolithography method and an etching method. The optical element 30 thus prepared was assembled in an optical head device as shown in FIG. 15. In the optical head device of FIG. 15, a semiconductor laser source 511A having a wavelength band of 650 nm and a semiconductor laser source 511B having a wavelength band of 780 nm were used as the light sources. Light emitted from each of the semiconductor laser sources transmit through collimater lenses 513A, 513B respectively and are introduced into a beam splitter 514 in which the optical axes are agreed with each other. Then, the light transmit through a polarizing diffraction element 51B.

As the polarizing diffraction element 51B, a polarizing hologram wherein a lattice-like concave and convex portion was formed in a thin film of polymerized liquid crystal having birefringent properties, and the concave and convex portion of the thin film of polymerized liquid crystal was filled with an optically isotropic medium having substantially the same refractive index as the ordinary refractive index of the polymerized liquid crystal, was used. In this polarizing hologram, the diffraction efficiency varies depending on polarization directions of incident light. In a going path from the semiconductor laser source to the optical disk, a polarization direction of high transmittance is utilized, and in a returning path from the optical disk to the photodetector, a polarization direction of high diffraction efficiency is utilized.

Light transmitting through the polarizing diffraction element 51B transmits through the optical element 30 having both an aperture controlling function and a wavefront aberration correcting function of this example; is converged on the recording surface of an optical disk 516 by means of an objective lens 515, and is reflected by the optical disk. Reflected light from the optical disk is deflected slightly in its optical path by the optical element 30 and the polarizing diffraction element 51B, and is introduced into respective photodetectors 512A, 512B through a beam splitter 514.

In this example, by assembling the optical element 30 having an aperture controlling function and a wavefront aberration correcting function, as the optical element of the present invention in the optical head device, the number of parts constituting the optical head device could be reduced to thereby realize miniaturization. Further, since the optical element performed optimum aperture control at the time of reproducing CD and was capable of correcting the wavefront aberration, the aberration could be reduced, and good reproducing signals could be obtained.

EXAMPLE 5

Figure 10B:
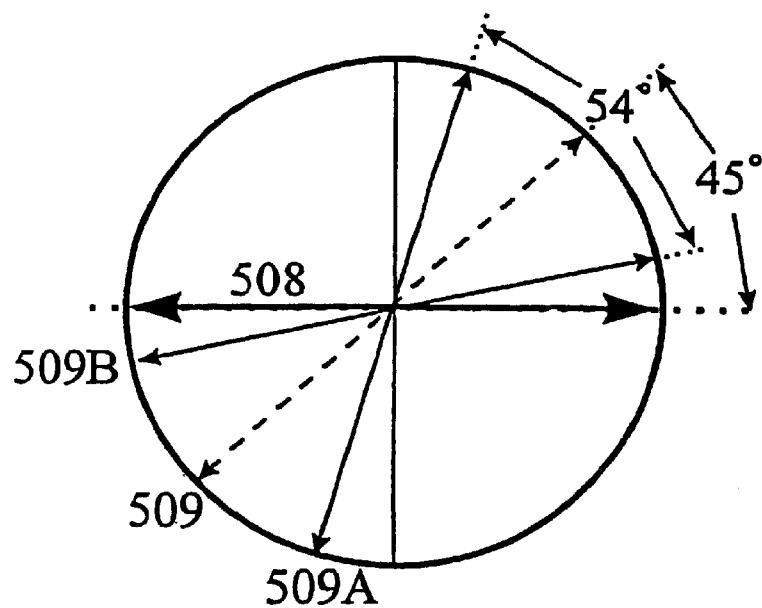

This example will be described with reference to FIG. 10(a) and FIG. 10(b). A broadband phase plate was prepared by laminated thin films of organic material 501A, 501B on fixing substrates 504, 505 made of glass having a thickness of 0.5 mm and fixing them by using UV curing type adhesives 502, 503. The thin film of organic material 501A is a phase plate having birefringent properties wherein the retardation value obtained by stretching polycarbonate is 260 nm and the thickness is 30 μm. The thin film of organic material 501B is a phase plate having birefringent properties wherein the retardation value obtained by stretching polycarbonate is 130 nm and the thickness is 30 μm. The thickness of each adhesive layer was about 5 μm.

Materials for constituting the broadband phase plate, i.e., for the thin films of organic material 501A, 501B, the adhesives 502, 503 and the fixing substrates 504, 505, are the same as those of Example 1. Accordingly, the linear expansion coefficients of the respective materials are the same as those in Example 1. The retardation values and the optical axis directions were measured by using semiconductor laser light having a wavelength band of 660 nm. With measured optical axes, the thin films of organic materials were arranged so that the fast axis direction 509A among optical axes of the thin film of organic material 501A is at an angle of about 54° with respect to the fast axis direction 509B among optical axes of the thin film of organic material 501B.

In measuring the angles, a counterclockwise direction observed from a side of the thin film of organic material 501B was taken as positive (+) when it is assumed that the thin film of organic material 501B is located above the thin film of organic material 501A. By taking a direction of −18° (the sign concerning the angular direction is defined above) with respect to the fast axis direction 509B of the thin film of organic material 501B as standard, the broadband phase plate was cut to have outer dimensions of 5 mm×5 mm by a dicing saw to obtain a broadband phase plate element 50. The fast axis direction 509 of the broadband phase plate was defined as an intermediate direction between respective fast axis directions of two laminated thin films of organic material.

The wavelength of emitted light from a semiconductor laser source having a wavelength band of 860 nm was taken as standard, and the ellipse ratio angle of the broadband phase plate element 50 was measured by using the second harmonic laser light having a wavelength band of 430 nm generated by using a non-linear optical crystal $KNbO_3$ and emitted light from a semiconductor laser source having a wavelength band of 789 nm. The linear polarization direction 508 of the above-mentioned laser light having two kinds of wavelength was at an angle of −45° with respect to the fast axis direction 509 of the broadband phase plate element. The light was introduced from a side of the fixing substrate 504 of glass. The measured ellipse ratio angle was about 86° to the laser light having wavelength band of 430 nm and about 88° to the wavelength band of 789 nm. Both were close to 90°, and sufficient properties in practical use were obtained.

Further, the transmittance wavefront aberration of the broadband retarder 50, as a result of measuring with use of He—Ne laser light having a wavelength of 633 nm, was 0.025 m$\lambda_{rms}$ or less which was of sufficiently usable level as the optical element.

The broadband retarder 50 was assembled as a quarter-wave plate 51A in the optical head device shown in FIG. 15. As a light source, a semiconductor laser source 511B having a wavelength band of 789 nm was used, and as the other light source, a semiconductor laser source having a wavelength band of 860 nm was disposed instead of the semiconductor laser source 511A having a wavelength band of 660 nm. A non-linear optical crystal $KNbO_3$ (not shown) is disposed between the laser semiconductor laser source and a collimater lens 513A to convert the wavelength into 430 nm. As a result, satisfactorily circularly polarized light could be obtained with respect to the two kinds of linearly polarized light of a wavelength band of 430 nm and a wavelength band of 789 nm, and signal light having high efficiency of utilization of light could be obtained.

EXAMPLE 6

Figure 23A:
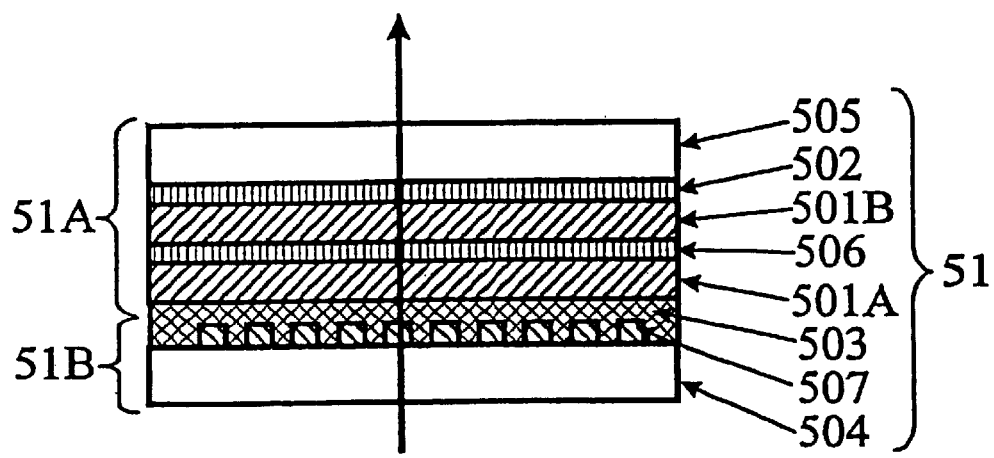
FIGS. 23(a) and 23(b) illustrate diagrams showing the structure of a polarizing diffraction element with the broadband phase plate of the seventh embodiment of the present invention wherein (a) is a cross-sectional view showing piled broadband phase plate and the polarizing diffraction element and (b) is a plan view showing an angular relation of each optical axis and so on of two piled phase plates.
Figure 23B:
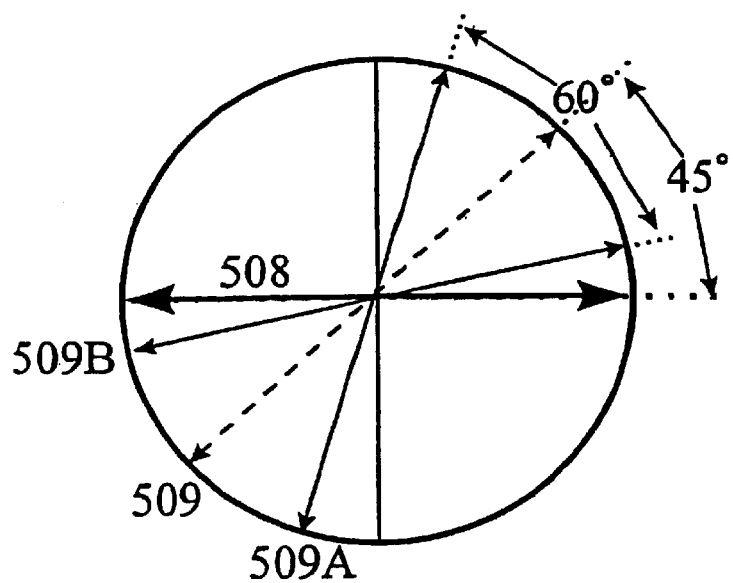

This example will be explained with reference to FIG. 23(a) and FIG. 23(b). As shown in FIG. 23(a), a fixing substrate 504 made of glass with an antireflection film on its one surface to which laser light is incident (a lower surface in the figure) was prepared. A film of polyimide was formed on the surface at an optical disk side (an upper surface in the figure) of the fixing plate 504, and the film was subjected to a horizontally aligning treatment by rubbing, whereby a polyimide aligning film (not shown) was formed. On the glass substrate subjected to an aligning treatment, a thin film of organic material of horizontally aligned polymerized liquid crystal was formed in a thickness of 3 μm. Then, a photolithography method and a dry etching method were conducted to prepare an organic grating 507 of polymerized liquid crystal having a pitch of 6 μm and a thickness of 3 μm.

As shown in FIG. 23(a), a broadband phase plate 51A was prepared by bonding a thin film of organic material 501B having birefringent properties (linear expansion coefficient $E_1=6.2\times10^{-6}/°$ C.) which had a retardation value of 180 nm obtained by stretching polycarbonate and a thickness of 30 μm to a thin film of organic material 501A having birefringent properties which had a retardation value of 360 nm obtained by stretching polycarbonate and a thickness of 30 μm by an adhesive 506 wherein the thin film of organic material 501B was bonded on a fixing substrate 505 as a cover glass (linear expansion coefficient $E_3=95\times10^{-7}/°$ C.) with the antireflection film on its upper surface by a polyester type UV curing adhesive 502 (linear expansion coefficient $E_2=1.2\times10^{-4}/°$ C.). In this case, adjustment was made so that the fast axis direction 509A of the thin film of organic material 501A was 600 with respect to the fast axis direction 509B of the thin film of organic material 501B.

Here, definition was made so that the fast axis direction 509 of the broadband phase plate was an intermediate direction between the respective fast axis directions of the two laminated thin films of organic material. In measuring angles, a counterclockwise direction observed from a side of the thin film of organic material 501 was taken as positive. Then, the surface at a side of the thin film of organic material 501A of the broadband phase plate 51A and the surface at a side of the organic grating 507 of the fixing substrate 504 of glass were bonded by an adhesive 503. In this case, arrangement was made so that the fast axis direction 509 of the broadband phase plate and the direction of linearly polarized light of incident laser light in a going path formed an angle of 45°, and the adhesive 503 was filled in spaces of the organic grating of polymerized liquid crystal 507. The adhesive 503 used here was an adhesive having a refractive index (n=1.5) which was equal to the ordinary refractive index $n_o$ of polymerized liquid crystal (ordinary refractive index $n_o$=1.5, extraordinary refractive index $n_e$=1.6) used for the organic grating. Finally, the laminate was cut by a dicing saw to prepare an optical element 51 in which the broadband phase plate 51A having outer dimensions of 4 mm 25×4 mm and a thickness of about 1.1 mm and the polarizing diffraction element 51B were unified.

Table 2 shows the optical characteristics of the thus prepared optical element in a wavelength band of 658 nm and a wavelength band of 787 nm. It was confirmed that an ellipse ratio angle of 85° or more could be obtained to any of the wavelength bands of 658 nm and 787 nm, and the optical element functioned as a quarter-wave plate having a sufficient durability in practical use.

TABLE 2

| Wavelength used for measurement | Transmittance in going path | Ellipse ratio angle of transmitted light | Diffraction efficiency |
|---|---|---|---|
| 658 (nm) | 98.0 (%) | 87.5 (degree) | 76 (%) |
| 787 | 97.5 | 88.2 | 60 |

This optical element was designed so that the diffraction characteristics were optimum at a wavelength band of 660 nm. Accordingly, a sufficiently high transmittance could be obtained in practical use although the diffraction characteristics in a wavelength band of 790 nm were more or less lower than those in the wavelength band of 660 nm. Further, the wavefront aberration of transmitted light was good as 0.025 $\lambda_{rms}$ or less in a central portion (in a circle having a diameter of 2.5 mm) in the light incident/emitting plane of the polarizing diffraction element.

This optical element 51 was installed in an actuator 517 for driving an objective lens 515 in an optical head device as shown in FIG. 15. As a result, sufficiently circularly polarized light was obtained with respect to the linearly polarized light having two kinds of wavelength: a wavelength band of 658 nm and a wavelength band of 787 nm. Further, the polarizing diffraction element functioned sufficiently to suppress the wavefront aberration, and signal light of extremely high efficiency of utilization could be obtained.

EXAMPLE 7

Example 7 is a concrete example concerning a retarder 60 as shown in FIG. 16. On a transparent fixing substrate 604 of glass (linear expansion coefficient $E_3$=95×10$^{-7}$/° C.) having a refractive index of 1.5, a thin film of organic material 601B (linear expansion coefficient $E_1$=6.2×10$^{-6}$/° C.) formed by stretching polycarbonate to provide birefringent properties was fixed by a polyester type UV curing adhesive 602 (linear expansion coefficient $E_2$=1.2×10$^{-4}$/° C.). The retardation value of $R_d$ of the thin film of organic material 601B was 362 nm. The value of Rd is half of the wavelength band value between a wavelength band of 660 nm for DVD and a wavelength band of 790 nm for CD used for the retarder. Then, a thin film of organic material 601A having the same retardation value $R_d$ of 362 nm as the above by stretching polycarbonate similarly to provide birefringent properties was fixed by a polyester type UV curing adhesive 606. In this case, the fixing was conducted so that the optical axis of the thin film of organic material 601A and the optical axis of the thin film of organic material 601B formed an angle of 67.5°.

Further, a transparent fixing plate 605 having a refractive index of 1.5 was bonded by using a polyester type UV curing adhesive 603 to thereby prepare the retarder 60. Linearly polarized light having two kinds of wavelength band introduced from a side of the fixing substrate 604 of the thus prepared retarder 60 was emitted with their polarization directions rotated 45° in a counterclockwise direction in the observation from a side of the fixing plate 605. On the other hand, linearly polarized light having two kinds of wavelength band introduced from a side of the fixing plate 605 of the phase plate 60 was emitted with their polarization directions rotated 45° in clockwise direction in the observation from a side of the fixing plate 605.

EXAMPLE 8

The retarder 60 prepared in Example 7 was disposed between a beam splitter 614B and a collimater lens 613 of an optical head device as shown in FIG. 17. Two kinds of linearly polarized light whose the planes of polarized light were parallel to each other, emitted from a semiconductor laser source 611A having a wavelength band of 660 nm and a semiconductor laser source 611B having a wavelength band of 790 nm were introduced into the retarder 60 from a side of a transparent fixing plate 604 (FIG. 16). The retarder 60 was disposed in the optical head device so that the polarization direction of laser light and the optical axis of the thin film of organic material 601B (FIG. 16) constituting the retarder 60 formed an angle of 55°. In the optical head device thus formed, light having a wavelength band of 660 nm and light having a wavelength band of 790 nm converged on an optical disk 616 were both linearly polarized light having their polarization directions being in parallel to each other.

Figure 24:
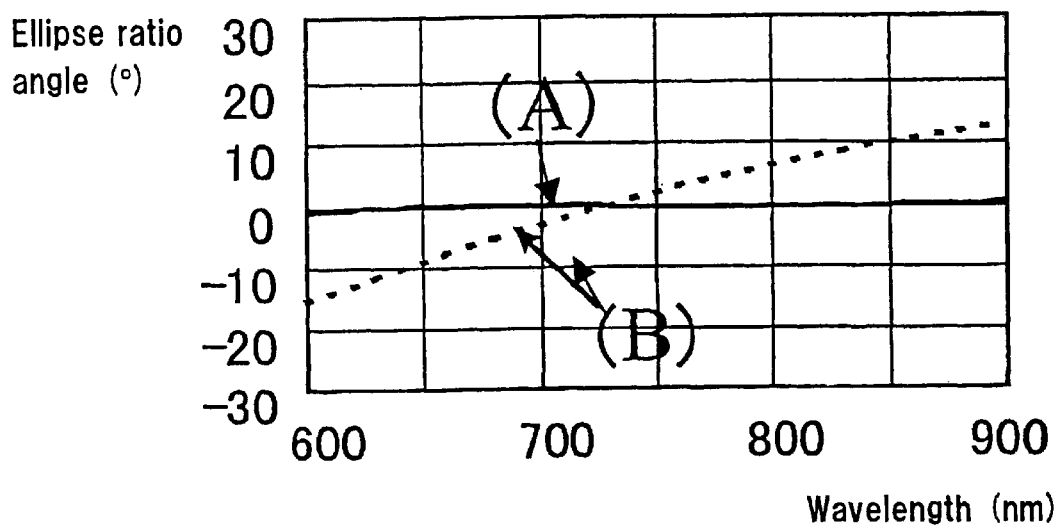
FIG. 24 is a graph showing the wavelength dependence of the ellipse ratio angle of light converged to an optical disk in the retarder of the eighth embodiment of the present invention as well as that in a conventional example.

FIG. 24 shows the wavelength dependence of ellipse ratio angles as a parameter indicating the linearity of polarized light. The solid line (A) in FIG. 24 shows the wavelength dependence of ellipse ratio angles of light transmitting through the retarder 60 and converged on the optical disk in this example, and shows substantially linearly polarized light in a broad wavelength band of 600–900 nm. On the other hand, the dotted line (B) in FIG. 24 shows the wavelength dependence of ellipse ratio angles of light transmitting through a conventional half-wave plate to be converged on the optical disk designed with respect to a wavelength of 730 nm. The region of linearly polarized light (a region of zero ellipse ratio angle) is very narrow.

Figure 25:
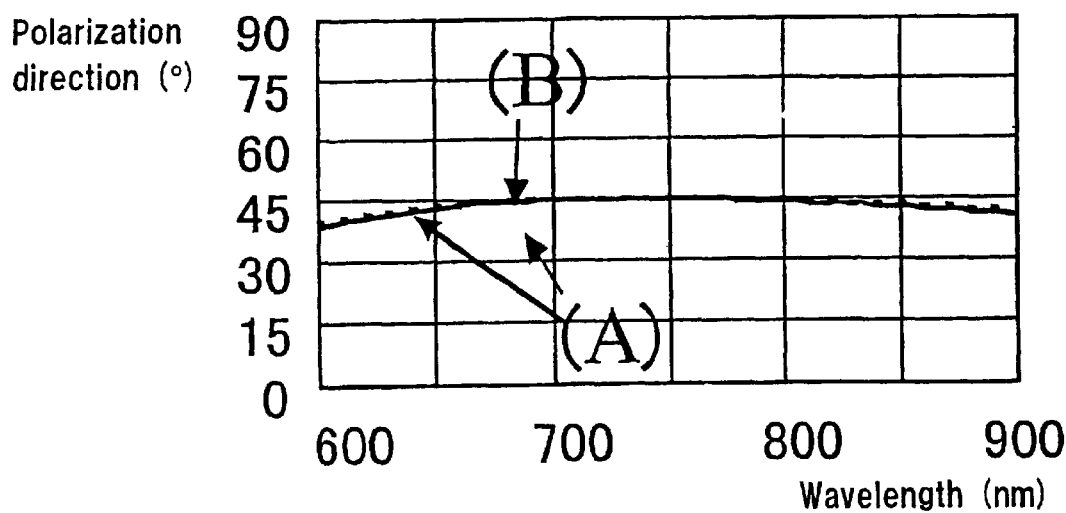
FIG. 25 is a graph showing the wavelength dependence of the polarization direction of light converged to an optical disk in the retarder of the eighth embodiment of the present invention as well as that in a conventional example.

FIG. 25 shows the wavelength dependence of polarization directions of light converged on the optical disk. The polarization direction means a long axis direction of elliptically polarized light. It is found from FIG. 25 that the polarization direction of light (solid line (A)) transmitting through the retarder 60 to be converged on the optical disk in this example and the polarization direction of light (dotted line (B)) transmitting through the conventional half-wave plate to be converged on the optical disk which was designed with respect to light having a wavelength band of 730 nm are not substantially different, and that both the polarization direction of the light having a wavelength band of 660 nm and the polarization direction of the light having a wavelength band of 790 nm are substantially 45°.

EXAMPLE 9

Example 9 is a concrete example of the optical element 71 shown in FIG. 19. On a transparent fixing substrate 704 made of glass (linear expansion coefficient $E_3 = 95 \times 10^{-7}/°$ C.) having a refractive index of 1.5, a thin film of organic material 701 made of polycarbonate (linear expansion coefficient $E_1 = 6.2 - 10^{-6}/°$ C.) having a retardation value of 1650 nm to light having a wavelength band of 660 nm was fixed by an acrylic type adhesive 702 (linear expansion coefficient $E_2 = 1.1 \times 10^{-4}/°$ C.). The phase difference produced in this case was $5\pi$ in $2\pi$ ($m_1 - \frac{1}{2}$) where $m_1 = 3$. Further, the phase difference corresponding to the above-mentioned phase difference, with respect to linearly polarized light having a wavelength band of 790 nm was $4\pi$ in $2\pi$ $m_2$ where $m_2 = 2$. Then, two kinds of linearly polarized light having a wavelength band of 660 nm and a wavelength band of 790 nm were incident into the thin film of organic material with their polarization directions inclined 45° with respect to the fast axis direction of the thin film of organic material.

With such phase differences, the planes of polarized light of the two kinds of light having different wavelength bands cross perpendicularly after they have transmitted through the thin film of organic material 701 of polycarbonate because the polarization plane of the linearly polarized light having a wavelength band of 660 nm was rotated 90° and the polarization plane of the linearly polarized light having a wavelength band of 790 nm was not rotated.

On the other hand, polyimide for an aligning film was coated on a transparent fixing substrate 705 having a refractive index of 1.5 to form a film. An aligning treatment was conducted to the film by rubbing and then, a film of polymerized liquid crystal was formed on the aligned film. The refractive index of the polymerized liquid crystal was about 1.6 in terms of the extraordinary refractive index $n_e$ and about 1.5 in terms of the ordinary refractive index $n_o$ after curing by photopolymerization. For the purpose of obtaining desired diffraction angle and diffraction efficiency to light having a wavelength band of 790 nm incident obliquely to the optical element 71, a transparent substrate having such function that only one kind of polarized light was diffracted between two perpendicularly crossing polarized light was prepared by conducting alternately photolithography and etching three times to thereby process the polymerized liquid crystal into a saw-teeth like grating 706 having 8 steps. The transparent substrate does not have a diffracting effect to light having a wavelength band of 660 nm.

The optical element 71 having such diffracting function that only light having a wavelength band of 790 nm was diffracted to make the optical axis of the light coincident with the optical axis of light having a wavelength band of 660 nm was prepared by fixing the thin film of organic material 701 to the transparent substrate so as to oppose the saw-teeth like grating 706 by using an acrylic type transparent filling adhesive 703 having a refractive index $n_o$ which was substantially equal to the ordinary refractive index $n_o$ of the polymerized liquid crystal.

EXAMPLE 10

The optical element 71 having a deflecting function to light having a wavelength band of 790 nm, prepared in Example 9, was disposed between a two-wavelength semiconductor laser source 711 and a beam splitter 714 in an optical head as shown in FIG. 20. The positions of light emitting points 711A and 711B generating two-wavelengths were separated from each other so that the respective optical axes were not coincident with each other. However, with use of the optical element 71, only light having a wavelength band of 790 nm was deflected so that it was made coincident with the optical axis of light having a wavelength band of 660 nm. As a result, a small wavefront aberration and excellent on-axial performance could be obtained, and good reproducing and recording could be carried out to optical disks of DVD and CD by using a photodetector 712 having a small light receiving surface area, commonly used in recording and reproducing information in the optical disks of CD and DVD.

Further, instead of the saw-teeth like grating 706 (FIG. 19) having a simple linear grating pattern, a hologram pattern wherein the pitch of grating and the direction of grating are changed in a surface area may be formed whereby a spatial distribution of phase is given to diffracted light having a wavelength band of 790 nm; a phase difference of the diffracted light can be adjusted, and light converging properties to an optical disk can further be improved. Specifically, the coma aberration resulted in diffracted light having a wavelength band of 790 nm because of a difference between the optical axis of the light having a wavelength band of 790 nm and the optical axis of incident light having a wavelength band of 660 nm, or the chromatic aberration or the spherical aberration resulted from a wavelength dispersion of the refractive index of the optical element used in the optical head device, due to a difference between a wavelength band of 660 nm and wavelength band of 790 nm, can be corrected.

Further, the same effect as above can be obtained by disposing the optical element 71 between the beam splitter 714 and the photodetector 712 in this optical head.

EXAMPLE 11

Figures 26A, 26B:
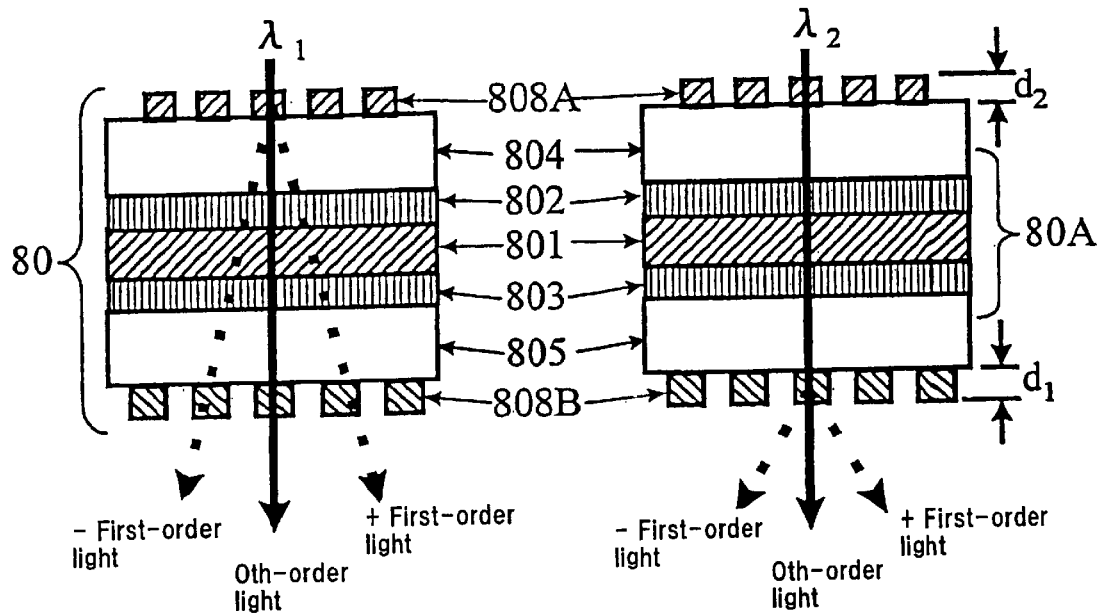
FIGS. 26(a) and 26(b) illustrate diagrams showing the structure of the two-wavelength diffraction element of the sixth embodiment of the present invention wherein (a) is a diagram showing a light path of incident light having a wavelength and (b) is a diagram showing an optical path of incident light having another wavelength.

Example 11 is a concrete example of the optical element shown in FIG. 9, and an application example having a structure that the phase plate comprising the thin film of organic material described in Example 6 and a diffraction grating are unified. FIG. 26 shows the structure of an optical element 80 in cross section according to this example. A thin film of organic material 801 made of polycarbonate (linear expansion coefficient $E_1 = 6.2 \times 10^{-6}/°$ C.) having a retardation value of 181 nm was interposed between transparent fixing substrates 804, 805 made of quartz glass (linear expansion coefficient $E_3 = 5 \times 10^{-7}/°$ C.) having a diffractive index of 1.46 so that the phase difference produced in light having a wavelength of 725 nm as an intermediate wavelength between a wavelength band of $\lambda_1 = 660$ nm and a wavelength band of $\lambda_2 = 790$ nm was $\pi/2$, and they were fixed by acrylic type adhesives layers 802, 803 (linear expansion coefficient $E_2 = 1.1 \times 10^{-4}/°$ C.), whereby a phase plate as the optical element 80 was prepared.

In this example, a diffraction grating 808A and a diffraction grating 808B each comprising a concave and convex portion having a uniform diffractive index are formed on surfaces of the fixing substrates 804, 805. The depth of grating $d_1$ of the concave and convex portion of the diffraction grating 808B is $d_1 \neq \lambda_1/(n_1 - 1)$ where the refractive index of a convex portion is $n_1$, and the depth of grating $d_2$ of the concave and convex portion of the diffraction grating 808A is $d_2 \neq \lambda_2/(n_2 - 1)$ where the refractive index of a convex portion is $n_2$.

Specifically, the surfaces of the fixing substrates 805, 804 were etched directly to obtain $d = 1.43$ μm and $d_2 = 1.72$ μm.

As a result, in the diffraction grating 808B, the phase difference in the concave and convex portion is $2\pi$ to the wavelength $\lambda_1$ but are not $2\pi$ to the wavelength $\lambda_2$. Further, in the diffraction grating 808A, the phase difference in the concave and convex portion is $2\pi$ to the wavelength $\lambda_2$ but not $2\pi$ to the wavelength $\lambda_1$.

Accordingly, a wavelength-selective diffraction grating having different diffracting functions to light having different wavelengths can be realized. Namely, as shown in FIG. 26, the diffraction grating 808A performs the diffracting function to incident light of wavelength $\lambda_1$, and produces the 0th-order light of about 71% and the ± first-order light of about 10%. On the other hand, the diffracting grating 808B performs the diffracting function to incident light of wavelength $\lambda_2$, and produces the 0th-order light of about 63% and the ± first-order light of about 13%.

This optical element 80 was disposed between two-wavelength semiconductor laser source 711 and the beam splitter 714 at an emitting side (not shown) of the optical element 71 in the optical head device shown in FIG. 20. Light of wavelength $\lambda_2$ emitted from the two-wavelength semiconductor laser source 711 is separated into 3 beams in total: one kind of the 0th-order light and two kinds of the ± first-order light by the optical element 80, which are used for detecting recorded information and tracking signals in the optical disk 716 of CD by a 3 beam method. Further, light of wavelength $\lambda_1$ emitted from the two-wavelength semiconductor laser source 711 is separated into 3 beams in total: the 0th-order light and the ± first-order light by the optical element 80 which are used for detecting recorded information and tracking signals in the optical disk 716 of DVD by a differential push-pull method.

Thus, in the optical head device installing the optical element 80 of this example, light of wavelength $\lambda_1$ and light of wavelength $\lambda_2$ are diffracted independently by the diffraction gratings 808A, 808B and accordingly, there is no reduction of efficiency and no stray light. Therefore, the recording and reproducing of information in optical disks of DVD and CD can stably be conducted.

Further, linearly polarized light having the wavelength $\lambda_1$ and the wavelength $\lambda_2$ transmitting through the optical element 80 are rendered to be substantially circularly polarized light by a phase plate 801 (FIG. 26) comprising a thin film of organic material having birefringent properties. Here, the phase plate 801 is fixed to the fixing substrates 804, 805 by the adhesive layers 802, 803. Accordingly, returning light reflected by the information recording surface of the optical disk and transmitting through the beam splitter 714 transmits again through the optical element 80, whereby the direction of linearly polarized light of the returning light is rendered to be perpendicular to the direction of linearly polarized light emitted from the laser oscillating source. Then, the returning light is incident into light emitting points of the semiconductor laser source. Accordingly, there is no interference between the returning light from the optical disk and the oscillated laser light, and no fluctuation of an oscillated output takes place, whereby the recording and reproducing of information in the optical disk can stably be conducted.

In this example, description has been made as to the optical element 80 in which the diffraction grating 808A and the diffraction grating 808B are formed. However, an element structure provided with either diffraction grating may be used. Further, the broadband retarder 50 according to the seventh embodiment shown in FIG. 10 may be used instead of the above-mentioned retarder 80A. In this case, the broadband retarder 50 functions as a quarter-wave plate to the wavelength $\lambda_1$ and the wavelength $\lambda_2$. Accordingly, the interference between the returning light from the optical disk and the oscillated laser light can further be reduced, and therefore, stability in recording and reproducing information in the optical disk can further be increased.

EXAMPLE 12

Figures 27A, 27B:
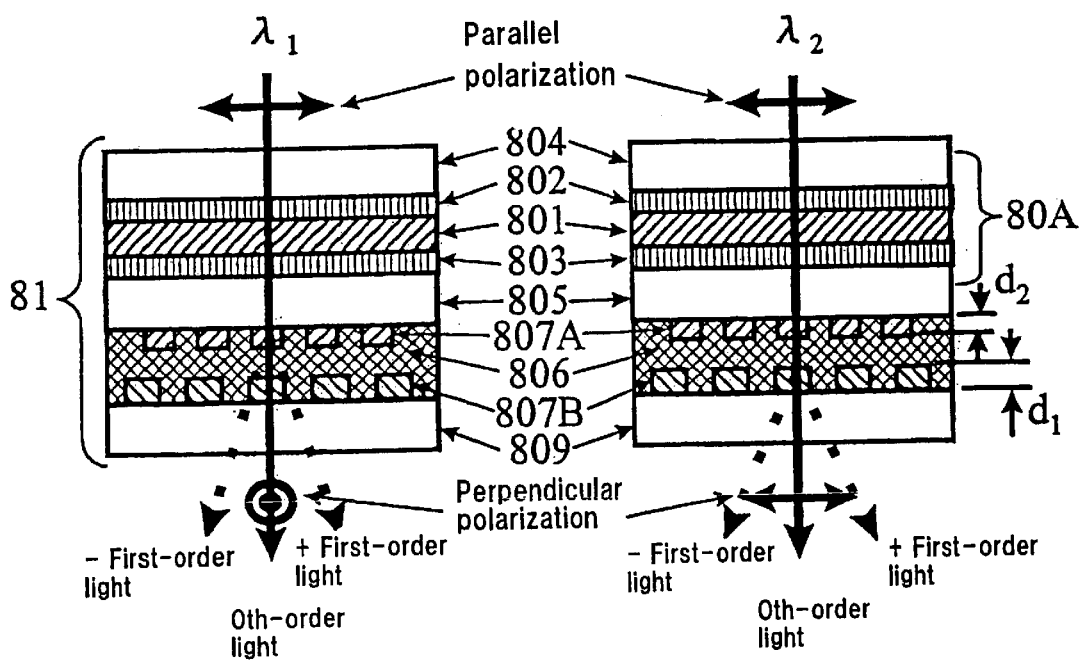
FIGS. 27(a) and 27(b) illustrate diagrams showing the structure of the two-wavelength diffraction element of the ninth embodiment of the present invention wherein (a) is a diagram showing an optical path of incident light having a wavelength and (b) is a diagram showing an optical path of incident light having another wavelength.

Example 12 is an application example of the optical element shown in FIG. 9 or FIG. 18, which has such structure described in Example 6 and Example 9 that the phase plate comprising the thin film of organic material and a polarizing diffraction grating are unified. FIG. 27 shows the structure of an optical element 81 in cross section of this example. In FIG. 27, the structure of a retarder 80A is the same as that of the optical element 70 in Example 9. A thin film of organic material 801 made of polycarbonate (linear expansion coefficient $E_1=6.2\times10^{-6}/°$ C.) was interposed between fixing substrates 804, 805 made of glass (linear expansion coefficient $E_3=95\times10^{-7}/°$ C.) and they were fixed by acrylic type adhesive layers 802, 803 (linear expansion coefficient $E_2=1.1\times10^{-4}/°$ C.). The thin film of organic material 801 was adapted so that the polarization plane of linearly polarized light having a wavelength band of $\lambda_1=660$ nm was rotated 90° and the polarization plate of linearly polarized light having a wavelength band of $\lambda_2=790$ nm was not rotated. Accordingly, after the light having two-wavelength bands whose the planes of polarized light were parallel to each other had transmitted through the phase plate, their planes of polarized light were crossed perpendicularly. In this case, the two kinds of linearly polarized light having the wavelength $\lambda_1$ and the wavelength $\lambda_2$ were incident into the thin film of organic material with their polarization directions inclined 45° with respect to the fast axis direction of the thin film of organic material.

On the other hand, polarizing diffraction gratings 807A, 807B comprising polymerized liquid crystal formed on the fixing substrates 805, 809 of glass were prepared by the same manufacturing process as in Example 9. Here, the diffraction grating 807A was a linear grating of rectangular shape in cross section wherein the direction of polymerized liquid crystal was aligned so that diffracted light was produced with respect to linearly polarized light of wavelength $\lambda_2$ and diffracted light was not produced with respect to linearly polarized light of wavelength $\lambda_1$ which crossed perpendicular to the linearly polarized light of wavelength $\lambda_2$. On the other hand, the diffraction grating 807B was a linear grating of rectangular shape in cross section wherein the aligned direction of polymerized liquid crystal was perpendicular to the aligned direction of the polymerized liquid crystal constituting the diffraction grating 807A so that diffracted light was produced with respect to linearly polarized light of wavelength $\lambda_1$ and diffracted light was not produced with respect to linearly polarized light of wavelength $\lambda_2$. The fixing substrates 805, 809 on which the diffraction gratings 807A, 807B were formed were bonded by using a filling adhesive 806 having a refractive index which was substantially equal to the ordinary refractive index of the polymerized liquid crystal.

Linearly polarized light having a wavelength $\lambda_1$ and a wavelength $\lambda_2$ whose the planes of polarized light were parallel to each other were introduced into the optical element 81 having such structure. Then, the diffraction gratings 807A and 807B could produce respectively the 0th-order light and the ± first-order diffracted light having a wavelength $\lambda_1$ and a wavelength $\lambda_2$ independently. The pitch of grating and the steps of grating $d_1$ and $d_2$ of the diffraction grating 807A and the diffraction grating 807B were so determined that a desired diffraction angle and diffraction efficiency could be obtained.

The optical element 81 of this example was disposed instead of the optical element 71 between the two-wavelength semiconductor laser source 711 and the beam splitter 714 of the optical head device shown in FIG. 20. Light having a wavelength $\lambda_2$ emitted from the two-wavelength semiconductor laser source 711 is separated into 3 beams in total: one kind of the 0th-order light and two kinds of the ± first-order light by the optical element 81, which are used for detecting recorded information and tracking signals in the optical disk 716 of CD by 3 beam method. Further, light having a wavelength $\lambda_1$ emitted from the two-wavelength semiconductor laser source 711 is separated into 3 beams in total: the 0th-order light and the ± first-order light by the optical element 81, which are used for recorded information and tracking signals in the optical disk 716 of DVD by a differential push-pull method.

Unlike Example 11, since there is no restriction for the steps of grating $d_1$ and $d_2$ of the diffraction gratings 807B and 807A, which produce a phase difference of $2\pi$ with respect to either wavelength, designing can be flexible to obtain desired diffraction efficiency with respect to wavelengths functioning as diffraction grating. Such feature improves optically recording efficiency to an optical disk in an optical head device for recording information, and accordingly, it is suitable for a case that the efficiency of the 0th-order light be 80% or more and the ± first-order diffraction light be reduced.

In FIG. 20, the case that the optical element 81 is disposed in place of the optical element 71 has been explained. However, the optical element 81 may be disposed at a light emission side of the optical element 71. In this case, since incident light having a wavelength $\lambda_1$ and a wavelength $\lambda_2$ to the optical element 81 have already been perpendicularly crossing polarized light, the phase plate 801 is not used at a light incident side in the structure of the optical element 81 in FIG. 27. Instead, when a phase plate comprising a thin film of organic material (not shown) made of polycarbonate having a retardation value of 181 nm is unified with the optical element at its light emission side in the same manner as in Example 11, the interference between returning light from the optical disk and oscillated laser light can be reduced, and the recording and reproducing of information in the optical disk can stably be conducted.

INDUSTRIAL APPLICABILITY

As described above, according to the present invention, an adhesive is coated on at least one surface of a thin film of organic material having birefringent properties and a phase-difference producing function; a fixing substrate having a transmitting or reflecting function is bonded to the thin film of organic material by the adhesive, and materials wherein relations of $E_1<E_2$ and $E_3<E_2$ where $E_1$ is the linear expansion coefficient of the thin film of organic material, $E_2$ is the linear expansion coefficient of the adhesive and $E_3$ is the linear expansion coefficient of the fixing substrate, and the glass transition temperature of the thin film of organic material is 150° C. or more, are selected. Accordingly, the temperature characteristics of a phase difference can be obtained in the direction of suppressing a temperature change of oscillated wavelength from a semiconductor laser source, and therefore, a phase difference can be kept to a constant value even when there is a fluctuation of the wavelength of emitted light from a semiconductor laser source due to a temperature change. In particular, a predetermined phase-difference producing function can be maintained stably even in a high temperature region. Further, expansions of the thin film of organic material and the fixing substrate with a temperature rise can be absorbed by the adhesive, and a deformation of the retarder can be prevented. Accordingly, a retarder free from a change of phase difference, a change of the retardation axis direction and a disturbance of the wavefront of laser light transmitting through the retarder can be provided.

Further, by combining a polarizing diffraction element having different diffraction efficiencies depending on polarization directions of incident light with the above-mentioned phase plate, a fluctuation of the oscillated wavelength of semiconductor laser due to temperature can be compensated in the retarder, and accordingly, a change of diffraction efficiency due to temperature in the diffraction element can be prevented. As a result, an optical element minimizing the transmission wavefront aberration and being compact, and having both functions as a polarizing diffraction element and retarder can be obtained.

Further, by giving at least one function among an aperture controlling function, a wavefront aberration correcting function and a diffracting function to at least one of transparent substrates as fixing substrates of the retarder, an optical element having a plurality of functions such as a phase-difference producing function can be formed. Further, by assembling the optical element in an optical head device, the number of parts constituting the optical head device can be reduced, and the size-reduction can be achieved.

Further, a broadband phase plate is disposed between a light source and an objective lens in an optical head device, and the broadband phase plate comprises two phase plates which are piled up so that respective optical axes cross to each other wherein the retardation value of the phase plate to which laser light is first incident, is larger than the retardation value of the phase plate to which laser light is incident secondly, and the ratio of these retardation values is 1.8–2.2. With this structure, the broadband phase plate functions as a quarter-wave plate with respect to transmitting laser light which is polarized linearly and has different wavelengths, whereby linearly polarized light can be transformed into circularly polarized light. Accordingly, by assembling the broadband phase plate in the optical head device, signal light detected as reflected returning light having different wavelengths from the optical disk becomes signal light having high efficiency of utilization of light.

Further, the retarder of the present invention can provide the same phase difference with respect to laser light having both wavelengths for CD and DVD while a state of linear polarization is maintained, and the polarization directions of the laser light having the both wavelengths can be rotated by the same angle. By installing such retarder in the optical head device, the optical head device which minimizes error in recording or reproducing information in the optical disk and detects signal stably, can be realized.

Further, in the retarder of the present invention, linearly polarized light having two different kinds of wavelength whose the planes of polarized light are in parallel to each other can be crossed perpendicularly. By adding a polarizing diffracting function to such retarder, a diffraction element having wavelength selectivity can be obtained. Further, by installing it in an optical head device having a two-wavelength semiconductor laser source in which positions of light emitting points are slightly different, the optical axes of two kinds of linearly polarized light can be agreed with each other. Further, 3 beams for detecting signals can be formed for each wavelength. As a result, each optical part in the device can perform good optical performance, and optical head device which can detect signals stably and lessen error in recording or reproducing information by using a photodetector used in common for two-wavelengths, can be realized, and size-reduction and the weight-reduction can be realized.

What is claimed is:

1. A retarder comprising:

a thin film of organic material having birefringent properties, an adhesive coated on at least one surface of the thin film of organic material, and a fixing substrate having transmitting or reflecting properties, bonded to the thin film of organic material by the adhesive, wherein among the linear expansion coefficient $E_1$ of the thin film of organic material, the linear expansion coefficient $E_2$ of the adhesive and the linear expansion coefficient $E_3$ of the fixing substrate, relations of $E_1<E_2$ and $E_3<E_2$ are satisfied.

2. The retarder according to claim 1, wherein the thin film of organic material includes at least one selected from the group consisting of polycarbonate, polyimide, polyallylate, polyethersulfone, (alicyclic) polyolefin, poly(meth)acrylate, polyetherimide and polymerized liquid crystal.

3. The retarder according to claim 1, wherein the adhesive includes at least one selected from the group consisting of acryl type, epoxy type, urethane type and polyester type.

4. An optical head device comprising:

a semiconductor laser light source, an objective lens for converging laser light emitted from the semiconductor laser light source, an optical recording medium to which the laser light is converged and introduced, a photodetector for receiving reflected light from the optical recording medium and, an optical element fabricated by combining a retarder as described in claim 1 with a polarizing diffraction element having different diffraction efficiencies depending on a state of polarization of incident light wherein the optical element is located in an optical path from the laser light source to the optical recording medium, or an optical path from the recording medium to the photodetector.

5. An optical element wherein a structure having at least one element among the following three elements is formed on a fixing substrate on which a retarder as described in claim 1 is formed:

(1) an aperture controlling element provided with a first region in a central portion, which transmits light having two or more kinds of wavelength and a second region surrounding the first region, which reflects or diffracts light having one or more kinds of wavelength, (2) a retarder having a ringed belt-like groove for correcting the wavefront of transmitted light in a central portion, which transmits light having two or more kinds of wavelength, and (3) a diffraction element having a periodic concave and convex portion in cross-sectional view, which diffracts incident light.

6. In an optical head device wherein laser light emitted from a semiconductor laser source is converged by an objective lens to be introduced into an optical recording medium, and reflected light from the optical recording medium is received by a photodetector, the optical head device being characterized in that the optical element described in claim 5 is located in an optical path from the laser light source to the optical recording medium, or a light path from the optical recording medium to the photodetector.

7. An optical head device comprising:

a semiconductor laser light source for emitting linearly polarized light having wavelengths of $\lambda_1$ and $\lambda_2$ ($\lambda_1<\lambda_2$), an objective lens for converging the laser light emitted from the semiconductor laser source, an optical recording medium to which the laser light is converged and introduced, a photodetector for receiving reflected light from the optical recording medium, and an retarder described in claim 1 located in an optical path from the laser light source to the optical recording medium wherein the linearly polarized light having wavelengths of $\lambda_1$ and $\lambda_2$ are incident to the retarder, two thin films of organic material having birefringent properties each having a retardation value 100 of $\lambda_2$ with respect to linearly polarized light having a wavelength of $\lambda$ in a relation of $\lambda_1 \leq \lambda \leq \lambda m_2$ are piled up so that the respective optical axes are crossed, and when the linearly polarized light having wavelengths of $\lambda_1$ and $\lambda_2$ are transmitted through the thin films of organic material, the planes of polarized light provided by the linearly polarized light are rotated by the same angle.

8. An optical head device comprising:

a semiconductor laser light source for emitting two kinds of linearly polarized light having different wavelengths and the planes of polarized light in parallel to each other, an objective lens for converging the laser light emitted from the semiconductor laser source, an optical recording medium to which the laser light is converged and introduced, a photodetector for receiving reflected light from the optical recording medium, and an retarder described in claim 1 located in an optical path from the laser light source to the optical recording medium, or an optical path from the optical recording medium to the photodetector, wherein the retarder comprises a thin film of organic material to produce a phase difference of $2\pi (m_1-½) $ ($m_1$ is a natural number) with respect to a kind of linearly polarized light and a phase difference of $2\pi m_2$ ($m_2$ is a natural number) with respect to the other kind of linearly polarized light when the two kinds of linearly polarized light having different wavelengths are transmitted therethrough with an inclination of 45° in a polarization direction in its fast axis direction, whereby the planes of polarized light provided by the linearly polarized light of two kinds of wavelengths cross perpendicularly.

* * * * *